US012037023B2

(12) United States Patent
Ran et al.

(10) Patent No.: US 12,037,023 B2
(45) Date of Patent: Jul. 16, 2024

(54) FUNCTION ALLOCATION FOR AUTOMATED DRIVING SYSTEMS

(71) Applicant: CAVH LLC, Fitchburg, WI (US)

(72) Inventors: Bin Ran, Fitchburg, WI (US); Tianyi Chen, Madison, WI (US); Shuoxuan Dong, Madison, WI (US); Yang Cheng, Middleton, WI (US); Mingheng Zhang, Madison, WI (US); Xiaotian Li, Madison, WI (US); Shen Li, Madison, WI (US); Kunsong Shi, Madison, WI (US); Haotian Shi, Madison, WI (US); Yifan Yao, Madison, WI (US); Yanghui Mo, Madison, WI (US); Hongjie Liu, Madison, WI (US); Keshu Wu, Madison, WI (US); Ran Yi, Madison, WI (US)

(73) Assignee: CAVH LLC, Fitchburg, WI (US)

( * ) Notice: Subject to any disclaimer, the term of this patent is extended or adjusted under 35 U.S.C. 154(b) by 422 days.

(21) Appl. No.: 17/328,625

(22) Filed: May 24, 2021

(65) Prior Publication Data

US 2021/0394797 A1 Dec. 23, 2021

Related U.S. Application Data

(60) Provisional application No. 63/042,620, filed on Jun. 23, 2020.

(51) Int. Cl.
B60W 60/00 (2020.01)
G08G 1/01 (2006.01)

(52) U.S. Cl.
CPC ....... B60W 60/0027 (2020.02); G08G 1/0112 (2013.01); G08G 1/0116 (2013.01);
(Continued)

(58) Field of Classification Search
CPC ......... B60W 60/0027; B60W 2556/45; B60W 2756/10; B60W 2556/35; G08G 1/0112;
(Continued)

(56) References Cited

U.S. PATENT DOCUMENTS 8,527,139 B1 9/2013 Yousuf
10,380,886 B2 8/2019 Ran et al.
(Continued)

FOREIGN PATENT DOCUMENTS

CN 109118758 A * 1/2019 ........... G08G 1/0116
EP 2395472 A1 12/2011
(Continued)

OTHER PUBLICATIONS

"Yicong Wang, Performance and Scaling of Collaborative Sensing and Networking for Automated Driving Applications, May 2018, IEEE International Conference on Communications Workshops (ICC Workshops)" (Year: 2018).*
(Continued)

Primary Examiner — Tiffany P Young
(74) Attorney, Agent, or Firm — Casimir Jones, S.C.; Brian F. Bradley; Thomas A. Isenbarger

(57) ABSTRACT

The technology described herein provides Automated Driving System (ADS) methods and systems for coordinating and/or fusing intelligence and functions between Connected Automated Vehicles (CAV) and ADS infrastructure to provide target levels of automated driving. The technology provides systems and methods for function allocation comprising sensing allocation, prediction and decision-making allocation, and control allocation. The ADS operates across various intelligence levels, identified during vehicle operation. The function allocation system dynamically allocates essential functions based on the intelligence levels of both vehicles and infrastructures, ensuring that ADS achieves a
(Continued)

system intelligence that surpasses that of individual components. This methodical function distribution enables ADS to manage both vehicles and infrastructures in a manner that enhances vehicular operations and control. The system further integrates a fusion system to support various ADS functions through data integration from multiple sources, which optimizes the driving tasks performed by CAVs.

20 Claims, 15 Drawing Sheets

(52) U.S. Cl.
CPC ....... *G08G 1/0145* (2013.01); *B60W 2556/45* (2020.02); *B60W 2756/10* (2020.02)

(58) Field of Classification Search
CPC ............... G08G 1/0116; G08G 1/0145; G08G 1/096725; G08G 1/09675; G08G 1/096783; G05D 1/0088
See application file for complete search history.

(56) References Cited

U.S. PATENT DOCUMENTS

| | | | |
|---|---|---|---|
| 10,867,512 B2 | 12/2020 | Ran et al. | |
| 2012/0105639 A1 | 5/2012 | Stein et al. | |
| 2013/0141480 A1 | 6/2013 | Lin et al. | |
| 2015/0325753 A1 | 11/2015 | Lai | |
| 2017/0075195 A1 | 3/2017 | Stein | |
| 2018/0336780 A1* | 11/2018 | Ran | G08G 1/0133 |
| 2019/0049958 A1 | 2/2019 | Liu et al. | |
| 2019/0096238 A1* | 3/2019 | Ran | G08G 1/096725 |
| 2019/0244521 A1 | 8/2019 | Ran et al. | |
| 2019/0340921 A1 | 11/2019 | Ran et al. | |
| 2019/0347931 A1 | 11/2019 | Ding et al. | |
| 2020/0005633 A1 | 1/2020 | Jin et al. | |
| 2020/0021961 A1 | 1/2020 | Li et al. | |
| 2020/0168081 A1 | 5/2020 | Ran et al. | |
| 2020/0249683 A1* | 8/2020 | Rosales | G08G 1/164 |
| 2020/0353917 A1* | 11/2020 | Leitermann | G05D 1/0214 |
| 2021/0065547 A1 | 3/2021 | Ran et al. | |
| 2021/0311491 A1 | 10/2021 | Li et al. | |
| 2021/0314752 A1 | 10/2021 | Ran et al. | |
| 2022/0126878 A1* | 4/2022 | Moustafa | G06T 1/0007 |

FOREIGN PATENT DOCUMENTS

| | | |
|---|---|---|
| WO | WO 2019/156956 | 8/2019 |
| WO | WO 2020/006161 | 1/2020 |
| WO | WO 2020/014128 | 1/2020 |
| WO | WO 2020/121300 | 6/2020 |
| WO | WO 2021/041091 | 3/2021 |

OTHER PUBLICATIONS

International Search Report and Written Opinion for PCT/US21/33910. Mailed Nov. 12, 2021. 13 Pages.

SAE International Standard J3016, "Taxonomy and Definitions for Terms Related to Driving Automation Systems for On-Road Motor Vehicles" J3016_201806. Revised Jun. 15, 2018. Retrieved from https://www.sae.org/standards/content/j3016_201806/ on Feb. 10, 2022. 35 pages.

\* cited by examiner

FUNCTION ALLOCATION FOR AUTOMATED DRIVING SYSTEMS

CROSS-REFERENCE TO RELATED APPLICATIONS

This application claims priority to U.S. Provisional Patent Application No. 63/042,620, filed on Jun. 23, 2020, the entire contents of which are fully incorporated herein by reference.

FIELD

Provided herein is technology relating to an automated driving system (ADS) that provides transportation management and operations and vehicle control for connected and automated vehicles (CAV) and, more particularly, to systems and methods for controlling CAV using function allocation strategies and systems comprising hardware components and software components provided by vehicles and an intelligent road infrastructure.

BACKGROUND

Connected and Automated Vehicles (CAV) that are capable of automated driving under certain conditions are in development. Usage of present CAV technologies is limited by costs (e.g., capital and/or energy costs) associated with the numerous sensors and computation devices provided on CAV and CAV performance is limited by the functional capabilities of sensors provided on CAV.

SUMMARY

Very recently, alternative systems and methods have been developed to address some of these problems. For example, an Automated Driving System (ADS) and/or components thereof is/are described in U.S. patent application Ser. Nos. 15/628,331; 16/509,615; 16/135,916; 16/267,836; 16/776,846; 16/505,034; 62/894,703; 63/004,551; and 63/004,564, each of which is incorporated herein by reference.

In particular, these ADS address limitations of CAV technologies and facilitate automated driving, e.g., by providing infrastructure that provides sensing functions, prediction functions, planning and decision making functions, and control functions for CAV. The technology described herein provides ADS methods and systems for coordinating and/or fusing intelligence and functions between CAV and ADS infrastructure to provide target levels of automated driving. For example, provided herein is technology relating to automated driving and particularly, but not exclusively, to systems comprising roadside intelligent units (RIU) and infrastructure of specific intelligence levels and related methods for providing and/or supplementing automated driving capabilities of connected and automated vehicles (CAV). In some embodiments, the technology provides a technology (e.g., systems and/or methods) for function allocation, e.g., sensing allocation; prediction and decision-making; and/or control allocation. In some embodiments, the technology provides fusion systems and/or methods to support the function allocation technology, e.g., vehicle-centric fusion, roadside centric fusion, and/or system-level fusion.

In some embodiments, the technology provides systems and methods for an ADS, e.g., an ADS comprising CAV with Level 2 intelligence and roadside infrastructures with Level 2 intelligence, to provide Level 3 intelligence for the system. For example, in some embodiments, the system comprises multiple kinds of sensors and computation devices on CAV and infrastructure (e.g., roadside infrastructure) and is configured to integrate sensing, prediction, planning, and control for automated driving of CAV. In some embodiments, the technology comprises systems (e.g., comprising system components) and methods (e.g., fusion processes) between two components to achieve Level 3 automated driving.

Accordingly, in some embodiments, the technology provided herein relates to a system configured to provide automated driving for an automated driving system (ADS) at a specified intelligence and/or automated driving level S for vehicles operating at an intelligence and/or automated driving level V by utilizing road intelligent infrastructure operating at an intelligence and/or automated level I, wherein S is greater than V. In some embodiments, S is greater than I. In some embodiments, systems further comprise a cloud-based service platform comprising a system cloud component, a vehicle cloud component, and/or an intelligent infrastructure cloud component to support communication, information exchange, operations, and control. See, e.g., U.S. patent application Ser. No. 16/454,268, incorporated herein by reference. In some embodiments, the ADS comprises roadside intelligent infrastructure and connected and automated vehicles (CAV). In some embodiments, the system is configured to integrate information from CAVs and roadside intelligent infrastructure to provide the specified intelligence and/or automated driving level S. In some embodiments, the system is configured to provide automated driving at a specified intelligence and/or automated driving level S for vehicles operating within a specified geographic area. In some embodiments, the geographic area comprises roads served by the AIDS and/or roads comprising the road intelligent infrastructure.

In some embodiments, the CAV operate at the intelligence and/or automated driving level V. In some embodiments, the intelligence and/or automated driving level V is level 2 (V2). In some embodiments, the CAV are configured to provide steering and acceleration support for automated driving of the CAV. In some embodiments, the CAV are configured to provide basic sensing functions for the CAV. In some embodiments, the CAV are configured to collaborate with the intelligent infrastructure according to integrated optimization performed by the system. In some embodiments, the CAV are configured to receive information and instructions from the intelligent infrastructure. In some embodiments, the CAV are configured to send information to the intelligent infrastructure. In some embodiments, the roadside intelligent infrastructure is configured to provide sensing functions, computation resources, and/or planning and decision-making functions. In some embodiments, the roadside intelligent infrastructure is configured to support the CAV to perform automated driving tasks by sending information and instructions to CAV.

Further, in some embodiments, the technology provides a function allocation system for an automated driving system (ADS). For example, in some embodiments, the function allocation system is configured to allocate functions to vehicles and infrastructure according to a sensing allocation plan, a prediction and decision-making allocation plan, and/or control allocation plan. In some embodiments, the system allocates functions among roadside intelligent unit (RIU) and/or CAV. In some embodiments, the system allocates functions before a trip according to the software and/or hardware capability levels of RIU and the software and/or hardware capability levels of a CAV.

Further, in some embodiments, the technology provides a sensing allocation system for an automated driving system (ADS). For example, in some embodiments, the sensing allocation system is configured to allocate sensing functions to intelligent infrastructure and CAV to improve the sensing accuracy and efficiency of the intelligent infrastructure and CAV. In some embodiments, the sensing allocation system allocates sensing functions at a microscopic level, a mesoscopic level, and/or a macroscopic level. In some embodiments, the sensing functions at a microscopic level comprise vehicle positioning, environmental sensing, and sensing and/or communicating vehicle information. In some embodiments, the sensing functions at a mesoscopic level comprise multi-vehicle sensing and road segment sensing. In some embodiments, the sensing functions at a macroscopic level comprise sensing network traffic flow and communicating information with a traffic control center (TCC). In some embodiments, the vehicle positioning comprises high-precision vehicle positioning. In some embodiments, the vehicle positioning comprises a high-definition (HD) map.

In some embodiments, the sensing allocation system comprises vehicle-based sensing, roadside-based sensing, and/or system-based sensing, wherein the sensing allocation system allocates sensing functions among the vehicle-based sensing, the roadside-based sensing, and/or the system-based sensing according to an allocation strategy. In some embodiments, the allocation strategy provides sensing for vehicles according to road and CAV scenarios. In some embodiments, the system allocates sensing functions to CAV at a microscopic level and/or a mesoscopic level. In some embodiments, the system allocates high-precision positioning functions, static HD map functions, and self-information sensing functions to CAV. In some embodiments, the self-information sensing functions comprise sensing CAV steering angle, speed, and/or acceleration. In some embodiments, the system allocates mesoscopic sensing functions to CAV. In some embodiments, the mesoscopic sensing functions are provided by vehicle-based sensing functions. In some embodiments, the system allocates sensing functions to intelligent infrastructure at a microscopic level, mesoscopic level, and/or a macroscopic level. In some embodiments, the sensing functions at a microscopic level comprise auxiliary vehicle positioning, real-time dynamic HD map, and sensing objects. In some embodiments, sensing objects comprises sensing pedestrians, vehicles, and/or obstacles. In some embodiments, the sensing functions at a mesoscopic level comprise communicating information about road segments. In some embodiments, nte sensing functions at a macroscopic level comprise communicating network traffic flow information and/or information from a traffic control center (TCC).

In some embodiments, the technology provides a prediction and decision-making allocation system for an automated driving system (ADS). For example, in some embodiments, the prediction and decision-making allocation system is configured to allocate prediction and decision-making functions to intelligent infrastructure and/or CAV. In some embodiments the prediction and decision-making allocation system is configured to allocate prediction and decision-making functions at a microscopic level, mesoscopic level, and/or a macroscopic level. In some embodiments, the prediction and decision-making functions at a microscopic level comprise predicting vehicle trajectory, planning vehicle origin and/or destination, and/or performing emergency adjustments. In some embodiments, the prediction and decision-making functions at a mesoscopic level comprise predicting events, traffic incidents, work zones, traffic control operations, vehicle platooning, and/or predicting traffic for specific road segments. In some embodiments, the specific road segments comprise bridges, tunnels, ramps, service areas, intersections, tolls, and/or dedicated lanes. In some embodiments, the prediction and decision-making functions at a macroscopic level comprise predicting traffic flow and/or weather. In some embodiments, the prediction and decision-making functions at a macroscopic level comprise managing traffic according to a user optimal and/or system optimal traffic strategy. In some embodiments, the prediction and decision-making allocation system comprises vehicle-based prediction and decision-making, roadside-based prediction and decision-making, and/or system-based prediction and decision-making, wherein the prediction and decision-making allocation system is configured to allocate prediction and decision-making functions among the vehicle-based prediction and decision-making, the roadside-based prediction and decision-making, and/or the system-based prediction and decision-making according to an allocation strategy. In some embodiments, the allocation strategy is provided by the intelligent infrastructure and CAV. In some embodiments, the prediction and decision-making allocation system is configured to allocate prediction and decision-making functions at a microscopic level to CAV according to the CAV automation level. In some embodiments, the prediction and decision-making allocation system is configured to allocate prediction and decision-making functions at a mesoscopic level and/or a macroscopic level to the intelligent infrastructure.

In some embodiments, the technology provides a control allocation system for an automated driving system (ADS). For example, in some embodiments, the control allocation system configured to allocate control functions to intelligent infrastructure and/or CAV. In some embodiments, the control allocation system is configured to allocate control functions at a microscopic level, a mesoscopic level, and/or a macroscopic level. In some embodiments, the control functions at a microscopic level comprise functions for controlling individual vehicles. In some embodiments, the functions for controlling individual vehicles comprise braking, acceleration, speed control, and steering angle control. In some embodiments, control functions at a mesoscopic level comprise control of vehicle platooning. In some embodiments, control functions at a mesoscopic level comprise providing control instructions and/or strategies by an RIU. In some embodiments, control functions at a macroscopic level comprise control of traffic flow. In some embodiments, control functions at a macroscopic level comprise providing control instructions and/or strategies by a TCC and/or a TOC. In some embodiments, the control allocation system comprises and/or is configured to provide vehicle-based control, roadside-based control, and/or system-based control, wherein the control allocation system is configured to allocate control functions among the vehicle-based control, the roadside-based control, and/or the system-based control according to an allocation strategy. In some embodiments, the allocation strategy is provided by the intelligent infrastructure and CAV. In some embodiments, the control functions at a microscopic level are allocated to CAV. In some embodiments, the control functions at a mesoscopic level and/or a macroscopic level are allocated to the intelligent infrastructure.

In some embodiments, the technology provides a fusion system for an automated driving system (ADS). For example, in some embodiments, a fusion system for an ADS comprises vehicle-centric fusion, roadside-centric fusion, and/or system-level fusion, wherein the fusion system is configured to allocate fusion functions among the vehicle-centric fusion, roadside-centric fusion, and/or system-level fusion. In some embodiments, the fusion system is configured to provide data fusion, integrate information to make predictions, integrate information to make decisions, and coordinate control of CAV. In some embodiments, the vehicle-centric fusion is configured to provide real-time vehicle data processing. In some embodiments, the real-time data processing comprises integrating real-time vehicle data provided by a vehicle and environmental data provided by an RIU. In some embodiments, the real-time vehicle data comprises location, speed, acceleration, accelerator pedal state, brake pedal state, steering angle, energy consumption, and/or lane position.

In some embodiments, the fusion system is configured to provide sensing data fusion, prediction and decision-making data fusion, and/or control data fusion to support sensing functions, predicting and decision-making functions, and/or control functions of the ADS. In some embodiments, the fusion system is configured to coordinate high-precision positioning data, high-definition (HD) map data, environment data, and/or vehicle information. In some embodiments, the fusion system is configured to provide high-precision positioning data, high-definition (HD) map data, environment data, and/or vehicle information to CAV to support and/or improve vehicle sensing functions. In some embodiments, the fusion system is configured to coordinate vehicle trajectory prediction data, individual vehicle origin and destination planning data, and/or emergency adjustment data. In some embodiments, the fusion system is configured to provide vehicle trajectory prediction data, individual vehicle origin and destination planning data, and/or emergency adjustment data to CAV to support and/or improve vehicle prediction and decision-making functions. In some embodiments, the fusion system is configured to coordinate accelerator pedal data, braking pedal data, and/or steering angle data. In some embodiments, the fusion system is configured to provide accelerator pedal data, braking pedal data, and/or steering angle data to CAV to support and/or improve vehicle control function. In some embodiments, the fusion system is configured to provide accelerator pedal data, braking pedal data, and/or steering angle data to CAV to optimize CAV driving and control according to a control objective function.

In some embodiments, the roadside-centric fusion comprises a roadside intelligent unit (RIU) fusion subsystem. In some embodiments, the RIU fusion subsystem is configured to provide real-time RIU data processing functions. In some embodiments, the RIU data processing functions are configured to coordinate real-time vehicle information, environment information, and/or traffic information in a geographical area. In some embodiments, the geographic area comprises roads served by the ADS and/or a road segment comprising an RIU.

In some embodiments, the RIU fusion subsystem is configured to provide sensing data fusion, prediction and decision-making data fusion, and/or control data fusion to support sensing functions, predicting and decision-making functions, and/or control functions.

In some embodiments, the sensing data fusion integrates infrastructure sensing data from infrastructure sensors and vehicle sensing data from vehicle sensors. In some embodiments, the infrastructure sensing data comprises environment data describing pedestrians, vehicles, and/or objects. In some embodiments, the infrastructure sensing data comprises sensing data for a road segment served by an RIU. In some embodiments, the sensing data fusion provides information describing multiple vehicles. In some embodiments, the information describing multiple vehicles comprises real-time vehicle position and dynamic vehicle information. In some embodiments, the RIU fusion subsystem is configured to request information and/or data from vehicles and fuse the data and/or information from vehicles to improve a real-time dynamic map.

In some embodiments, the prediction and decision-making data fusion integrates data for event prediction, vehicle platooning, and/or information for a specific road segment. In some embodiments, the RIU fusion subsystem is configured to request data from a TCU to improve the prediction and decision-making functions. In some embodiments, the data from a TCU comprises speed limit information, emergency response vehicle information, and/or information describing vehicle emergencies.

In some embodiments, the control data fusion integrates information for intersection control, vehicle platooning control, and/or specific road segment vehicle control. In some embodiments, the fusion system is configured to provide information to an RIU from a TCU to improve the control functions. In some embodiments, the fusion system is configured to provide real-time system level data processing. In some embodiments, the system level data processing comprises integrating real-time vehicle data provided by an RIU, a vehicle onboard intelligent unit (OIU), a traffic control center (TCC), a traffic information center, a database, and/or a meteorological station.

In some embodiments, the system level data processing comprises sensing data fusion, prediction and decision-making data fusion, and/or control data fusion to support and/or improve sensing functions, predicting and decision-making functions, and control functions. In some embodiments, the sensing data fusion is configured to integrate environment information; dynamic map data; vehicle positioning data; vehicle information data; and/or road segment information. In some embodiments, the fusion system is configured to request and fuse data from vehicles, road segment infrastructure, and/or a traffic information center. In some embodiments, the fusion system fuses data to improve a real-time dynamic map. In some embodiments, the environment information is provided by an RIU, TCC, and/or vehicle sensors. In some embodiments, the dynamic map data is provided by a database. In some embodiments, the vehicle positioning data is provided by vehicle sensors and/or an RIU. In some embodiments, the vehicle information data is provided by infrastructure, RIU, and/or TCC. In some embodiments, the road segment information is provided by a vehicle, an RIU, and/or a TCU. In some embodiments, the prediction and decision-making data fusion is configured to integrate environment situation prediction data, traffic flow prediction data, road segment trajectory prediction data, and/or emergency adjustment data. In some embodiments, the fusion system is configured to request and/or receive data from vehicles, a road segment, and/or a traffic information center to support and/or improve the prediction and decision-making function.

Further, in some embodiments, the technology provides methods for automated driving, e.g., a method comprising providing a system as described herein (e.g., to improve the intelligence and/or automated driving level of a vehicle). In some embodiments, the technology provides methods comprising providing a function allocation system as described herein.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet, CAVH communications, cellular network). See, e.g., U.S. Pat. App. Pub. No. 20200005633, incorporated herein by reference.

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

These and other features, aspects, and advantages of the present technology will become better understood with regard to the following drawings.

Figure 1:
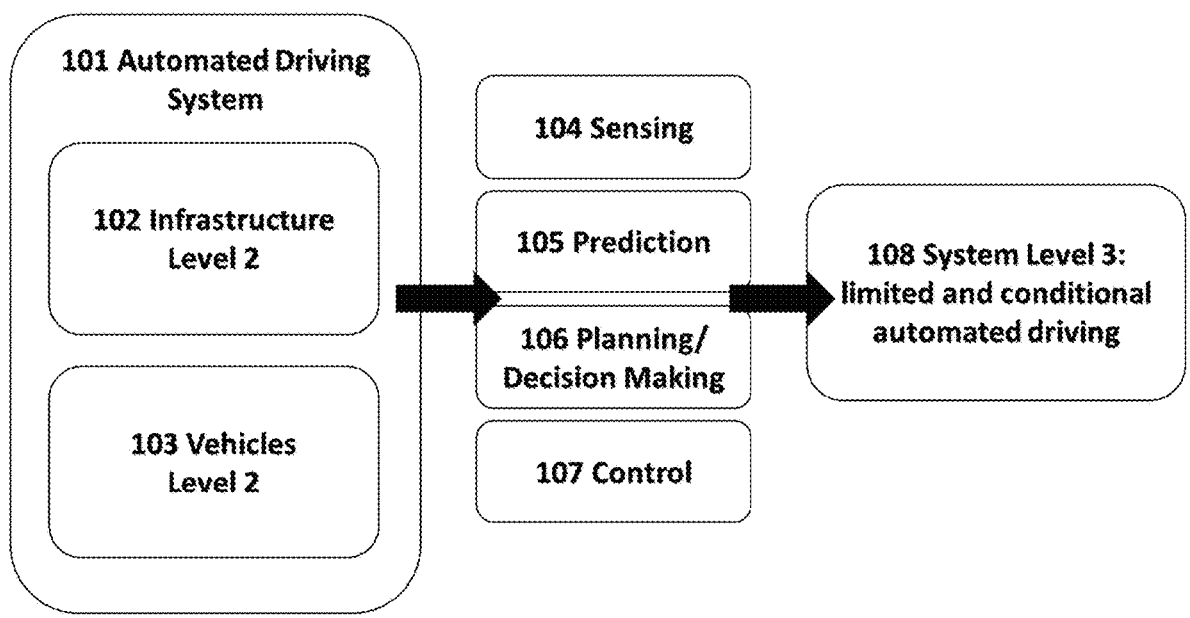
FIG. 1 is a schematic diagram showing an exemplary system structure of an embodiment of an ADS. 101: Automated Driving System (ADS); 102: Level 2 Intelligence Infrastructure; 103: Level 2 Intelligence Vehicle; 104: Sensing Function; 105: Prediction Function; 106: Planning and Decision-Making Function; 107: Control Function; 108: Level 3 Driving Tasks.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to an automated driving system (ADS) that provides transportation management and operations and vehicle control for connected and automated vehicles (CAV) and, more particularly, to systems and methods for controlling CAV using function allocation strategies and systems comprising hardware components and software components provided by vehicles and an intelligent road infrastructure.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

Definitions

To facilitate an understanding of the present technology, a number of terms and phrases are defined below. Additional definitions are set forth throughout the detailed description.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present or "absent") is used in a relative sense to describe the amount or level of a particular entity (e.g., an analyte). For example, when an analyte is said to be "present" in a test sample, it means the level or amount of this analyte is above a pre-determined threshold; conversely, when an analyte is said to be "absent" in a test sample, it means the level or amount of this analyte is below a pre-determined threshold. The pre-determined threshold may be the threshold for detectability associated with the particular test used to detect the analyte or any other threshold. When an analyte is "detected" in a sample it is "present" in the sample; when an analyte is "not detected" it is "absent" from the sample. Further, a sample in which an analyte is "detected" or in which the analyte is "present" is a sample that is "positive" for the analyte. A sample in which an analyte is "not detected" or in which the analyte is "absent" is a sample that is "negative" for the analyte.

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods.

As used herein, the term "vehicle" refers to any type of powered transportation device, which includes, and is not limited to, an automobile, truck, bus, motorcycle, or boat. The vehicle may normally be controlled by an operator or may be unmanned and remotely or autonomously operated in another fashion, such as using controls other than the steering wheel, gear shift, brake pedal, and accelerator pedal.

As used herein, the term "automated vehicle" (abbreviated as "AV") refers to an automated vehicle in an automated mode, e.g., at any level of automation (e.g., as defined by SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806), each of which is incorporated herein by reference).

As used herein, the term "configured" refers to a component, module, system, subsystem, etc. (e.g., hardware and/or software) that is constructed and/or programmed to carry out the indicated function.

As used herein, the terms "determine," "calculate," "compute," and variations thereof, are used interchangeably to any type of methodology, processes, mathematical operation, or technique.

As used herein, the term "support" when used in reference to one or more components of the ADS and/or a vehicle providing support to and/or supporting one or more other components of the ADS and/or a vehicle refers to, e.g., exchange of information and/or data between components and/or levels of the ADS and/or vehicles, sending and/or receiving instructions between components and/or levels of the ADS and/or vehicles, and/or other interaction between components and/or levels of the ADS and/or vehicles that provide functions such as information exchange, data transfer, messaging, and/or alerting.

As used herein, the term "ADS component" and "component of an ADS" refers individually and/or collectively to one or more of an OIU, RIU, TCC, TCU, TCC/TCU, TOC, and/or cloud component.

As used herein, the term "critical point" refers to a portion or region of a road that is identified as appropriate to be provided embodiments of the function allocation technology provided herein. In some embodiments, a critical point is categorized as a "static critical point" and in some embodiments, a critical point is categorized as a "dynamic critical point". As used herein, a "static critical point" is a point (e.g., region or location) of a road that is a critical point based on identification of road and/or traffic conditions that are generally constant or that change very slowly (e.g., on a time scale longer than a day, a week, or a month) or only by planned reconstruction of infrastructure. As used herein, a "dynamic critical point" is a point (e.g., region or location) of a road that is a critical point based on identification of road conditions that change (e.g., predictably or not predictably) with time (e.g., on a time scale of an hour, a (lay, a week, or a month). Critical points based on historical crash data, traffic signs, traffic signals, traffic capacity, and road geometry are exemplary static critical points. Critical points based on traffic oscillations, real-time traffic management, or real-time traffic incidents are exemplary dynamic critical points.

In some embodiments, critical points are identified using, e.g., historical crash data (e.g., the top 20% (e.g., top 15-25% (e.g., top 15, 16, 17, 18, 19, 20, 21, 22, 23, 24, or 25%)) most frequent crash points in a road system are identified as critical points); traffic signs (e.g., where certain traffic signs (e.g., accident-prone areas) are detected are identified as critical points); traffic capacity (e.g., the top 20% (e.g., top 15-25% (e.g., top 15, 16, 17, 18, 19, 20, 21, 22, 23, 24, or 25%)) highest traffic capacity areas are identified as critical points); road geometry (e.g., roads with critical road geometry (e.g., curves, blind spots, hills, intersections (e.g., signalized intersections, stop sign intersections, yield sign intersections), roundabouts) are identified as critical points); traffic oscillation (e.g., points with significant traffic oscillations are identified as critical points); real-time traffic management (e.g., points with potential traffic management are identified as critical points); and/or real-time traffic incident (e.g., points with traffic incidents (e.g., accident, crash, congestion, construction or maintenance, weather-related event, etc.) or vehicle malfunction are identified as critical points).

As used herein, the terms "microscopic", "mesoscopic", and "macroscopic" refer to relative scales in time and space. In some embodiments, the scales include, but are not limited to, a microscopic level relating to individual vehicles (e.g., longitudinal movements (car following, acceleration and deceleration, stopping and standing) and lateral movements (lane keeping, lane changing)), a mesoscopic level relating to road corridors and/or segments (e.g., special event early notification, incident prediction, merging and diverging, platoon splitting and integrating, variable speed limit prediction and reaction, segment travel time prediction, and/or segment traffic flow prediction), and a macroscopic level relating to an entire road network (e.g., prediction of potential congestion, prediction of potential incidents, prediction of network traffic demand, prediction of network status, prediction of network travel time). In some embodiments, a time scale at a microscopic level is from 1 to 10 milliseconds and is relevant to tasks such as vehicle control instruction computation. In some embodiments, a time scale at a mesoscopic level is typically from 10 to 1000 milliseconds and is relevant to tasks such as incident detection and pavement condition notification. In some embodiments, a time scale at a macroscopic level is longer than 1 second and is relevant to tasks such as route computing.

As used herein, the term "user-optimal traffic routing" refers to a strategy for routing traffic that optimizes routes for users to provide an equilibrium condition providing that no user can reduce its travel time by changing to a different route.

As used herein, the term "system optimal traffic routing" refers to a strategy for routing traffic that optimizes routes by minimizing the overall travel time and/or cost for the system.

As used herein, the automation and/or intelligence levels of vehicles (V), infrastructure (I), and system (S) are described with respect to an "intelligence level" and/or an "automation level". In some embodiments, the vehicle intelligence and/or automation level is one of the following: V0: No automation functions: V1: Basic functions to assist a human driver to control a vehicle; V2: Functions to assist a human driver to control a vehicle for simple tasks and to provide basic sensing functions; V3: Functions to sense the environment in detail and in real-time and to complete relatively complicated driving tasks; V4: Functions to allow vehicles to drive independently under limited conditions and sometimes with human driver backup; and V5: Functions to allow vehicles to drive independently without human driver backup under all conditions.

In some embodiments, the infrastructure intelligence and/or automation level is one of the following: I0: No functions; I1: Information collection and traffic management wherein the infrastructure provides primitive sensing functions in terms of aggregated traffic data collection and basic planning and decision making to support simple traffic management at low spatial and temporal resolution; I2: I2X and vehicle guidance for driving assistance, wherein, in addition to functions provided in I1, the infrastructure realizes limited sensing functions for pavement condition detection and vehicle kinematics detection, such as lateral and/or longitudinal position, speed, and/or acceleration, for a portion of traffic, in seconds or minutes; the infrastructure also provides traffic information and vehicle control suggestions and instructions for the vehicle through I2X communication; I3: Dedicated lane automation, wherein the infrastructure provides individual vehicles with information describing the dynamics of surrounding vehicles and other objects on a millisecond time scale and supports full automated driving on CAVH-compatible vehicle dedicated lanes; the infrastructure has limited transportation behavior prediction capability; I4: Scenario-specific automaton wherein the infrastructure provides detailed driving instructions for vehicles to realize full automated driving in certain scenarios and/or areas, such as locations comprising predefined geofenced areas, where the traffic is mixed (e.g., comprises automated and non-automated vehicles); essential vehicle-based automation capability, such as emergency braking, is provided as a backup system in case the infrastructure fails; and I5: Full infrastructure automation wherein the infrastructure provides full control and management of individual vehicles under all scenarios and optimizes a whole road network where the infrastructure is deployed; vehicle automation functionality is not necessary provided as a backup; full active safety functions are available.

In some embodiments, the system intelligence and/or automation level is one of the following: S0: no function; S1: the system provides simple functions for individual vehicles such as cruise control and passive safety function;

the system detects the vehicle speed, location, and distance; S2: the system comprises individual intelligence and detects vehicle functioning status, vehicle acceleration, and/or traffic signs and signals; individual vehicles make decisions based on their own information and have partially automated driving to provide complicated functions such as assisting vehicle adaptive cruise control, lane keeping, lane changing, and automatic parking; S3: the system integrates information from a group of vehicles and behaves with ad-hoc intelligence and prediction capability, the system has intelligence for decision making for the group of vehicles and can complete complicated conditional automated driving tasks such as cooperative cruise control, vehicle platooning, vehicle navigation through intersections, merging, and diverging; S4: the system integrates driving behavior optimally within a partial network; the system detects and communicates detailed information within the partial network and makes decisions based on both vehicle and transportation information within the network and handles complicated, high level automated driving tasks, such as navigating traffic signal corridors, and provides optimal trajectories for vehicles within a small transportation network; S5: vehicle automation and system traffic automation, wherein the system optimally manages an entire transportation network; the system detects and communicates detailed information within the transportation network and makes decisions based on all available information within the network; the system handles full automated driving tasks, including individual vehicle tasks and transportation tasks, and coordinates all vehicles to manage traffic.

In some embodiments, the system dimension is dependent on the vehicle and infrastructure dimensions, e.g., as represented by the following equation (S=system automation; V=vehicle intelligence; and I=infrastructure intelligence):

$$S=f(V,I)$$

One of ordinary skill in the art may refer to SAE International Standard J3016, "Taxonomy and Definitions for Terms Related to Driving Automation Systems for On-Road Motor Vehicles" (published in 2014 (J3016_201401) and as revised in 2016 (J3016_201609) and 2018 (J3016_201806)), which provides additional understanding of terms used in the art and herein.

DESCRIPTION

Provided herein is technology relating to an automated driving system (ADS) that provides transportation management and operations and vehicle control for connected and automated vehicles (CAV) and, more particularly, to systems and methods for controlling CAV using function allocation strategies and systems comprising hardware components and software components provided by vehicles and an intelligent road infrastructure.

For example, e.g., as shown in FIG. 1, embodiments of the system 101 described herein improve the efficiency and/or safety for individual vehicles 103 and traffic within a road segment covered and/or served by the system. In some embodiments, the technology (e.g., systems and/or methods) integrates information from vehicles 103 and infrastructure components 102 and completes conditional automated driving tasks 108 with ad-hoc intelligence through sensing 104, prediction 105 (e.g., prediction of real-time microscopic vehicle behaviors and trajectories and/or of short-term traffic status), planning and decision making 106, and control 107 for a group of vehicles 103 or a platoon 103 through coordinating and/or fusing the abilities of roadside infrastructure 102 and vehicles 103.

Figure 2:
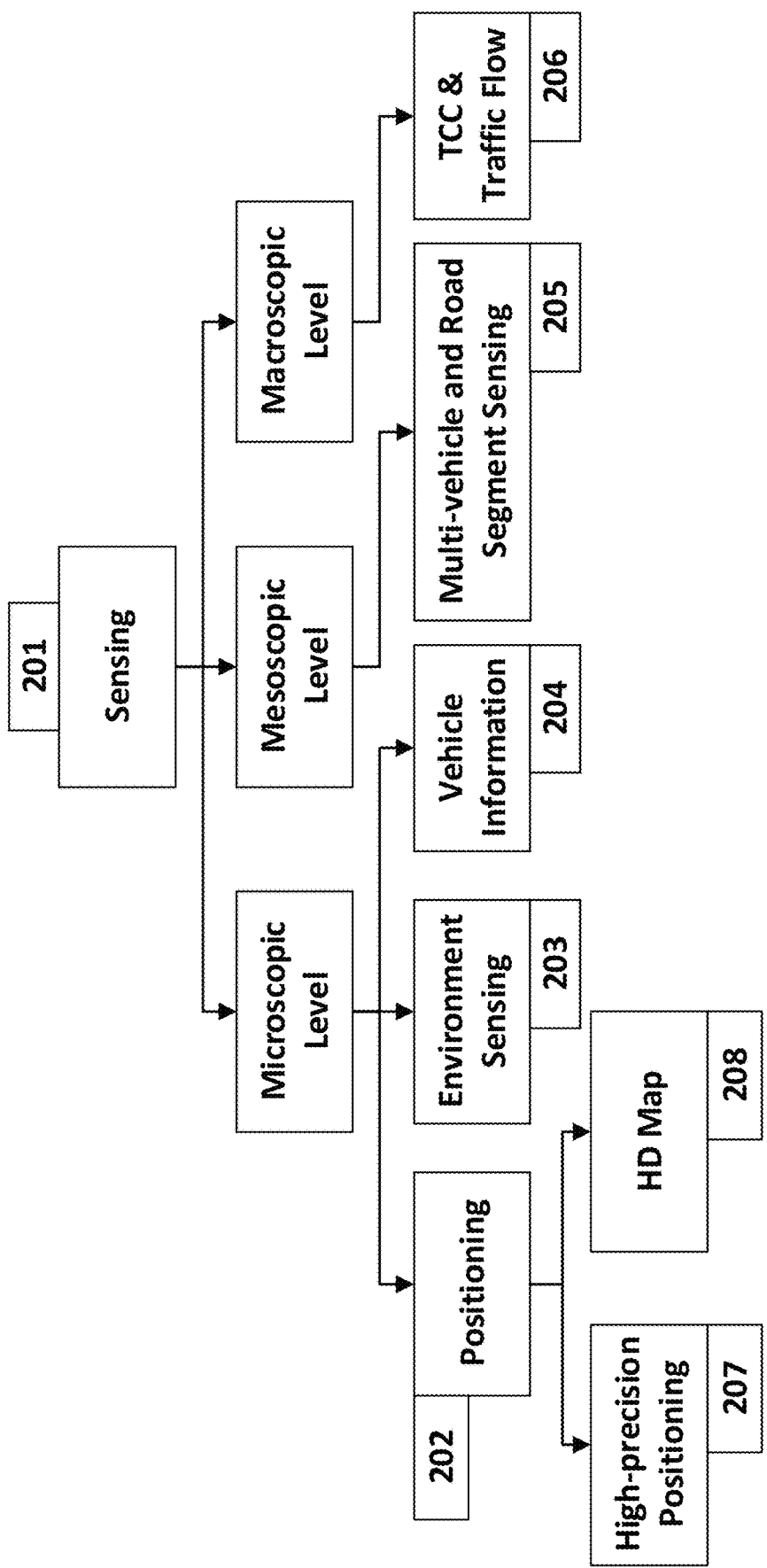
FIG. 2 is a schematic diagram showing an exemplary system structure of an embodiment of a sensing allocation system, e.g., comprising components and/or functions at a microscopic level, a mesoscopic level, and/or a macroscopic level. 201: Sensing Allocation Subsystem; 202: Positioning; 203: Environment Sensing; 204: Vehicle Information; 205: Multi-vehicle and road segment sensing; 206: Traffic control center (TCC) and traffic flow sensing; 207: High-precision Positioning; 208: High Definition Map.

In some embodiments, e.g., as shown in FIG. 2, the technology provides a sensing allocation system 201. In some embodiments, the system allocation system divides sensing functions into three categories (e.g., microscopic level, mesoscopic level, and/or macroscopic level) based on the analysis of the function and its application with respect to time and space scales for vehicle management and control. The microscopic level comprises positioning 202 (e.g., high-definition (HD) map 208, high-precision positioning 207, etc.), environment sensing 203, and vehicle information sensing 204. The mesoscopic level comprises multi-vehicle and road segment sensing 205. The macroscopic level comprises traffic control center (TCC) sensing and traffic flow sensing 206. In some embodiments, the sensing functions are assigned (e.g., distributed) to CAV and intelligent infrastructures based on an allocation strategy.

Figure 3:
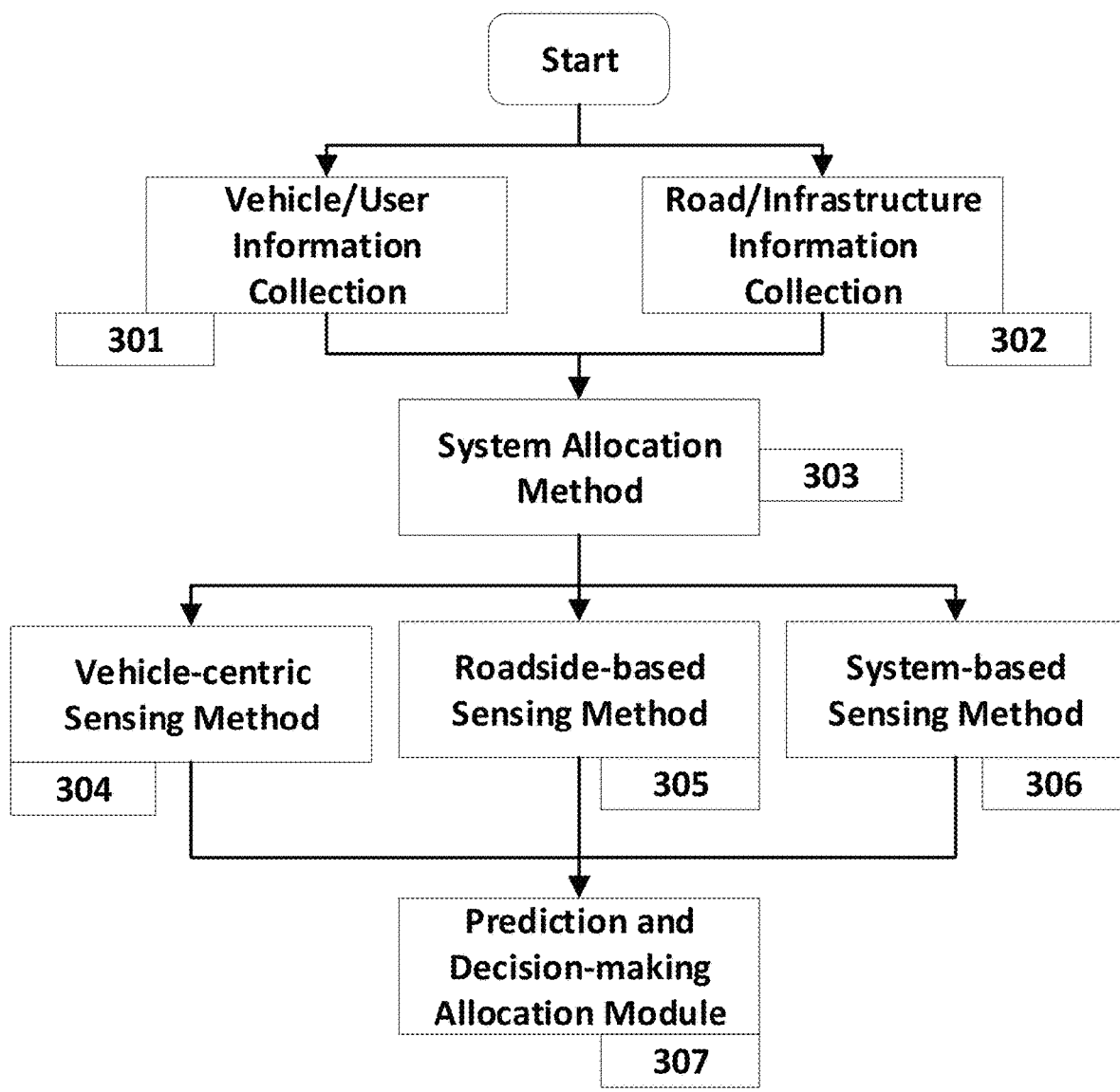
FIG. 3 is a flow diagram showing an exemplary data flow of an embodiment of a sensing allocation method and/or system. 301: Vehicle and user information collection method; 302: Road and infrastructure information collection method; 303: System Allocation Method; 304: Vehicle-centric Sensing Method; 305: Roadside-based Sensing Method; 306: System-based Sensing Method; 307: Prediction and Decision-making Allocation Module.

In some embodiments, e.g., as shown in FIG. 3, the technology relates to data flow for the sensing allocation system 303. For example, in some embodiments, the system analyzes data collected from vehicles 301 and infrastructures 302 to provide a customized allocation strategy 303 for both CAV and infrastructure (e.g., RIU). In some embodiments, the allocation strategy assigns sensing functions into three categories, e.g., vehicle-centric sensing 304, roadside-based sensing 305, and system-based sensing 306. In some embodiments, after assigning sensing functions, the system proceeds to the prediction and decision-making allocation method 307. In some embodiments, the allocation strategies are pre-loaded into the system. Accordingly, in some embodiments, when vehicles start a trip, the system automatically provides appropriate instructions to CAV and infrastructure (e.g., RIU) based on the preset strategies.

Figure 4:
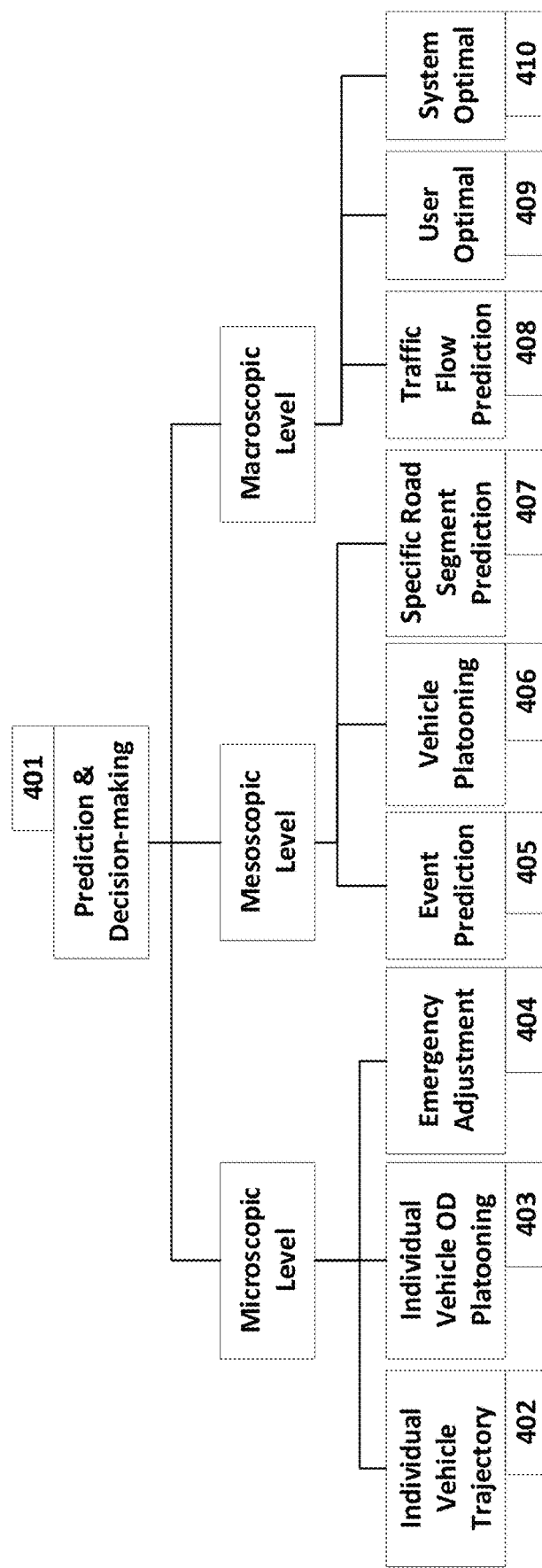
FIG. 4 is a schematic diagram showing an exemplary system structure of an embodiment of a prediction and decision-making allocation system, e.g., comprising components and/or functions at a microscopic level, a mesoscopic level, and/or a macroscopic level. 401: Prediction and Decision-making Allocation Subsystem; 402: Individual Vehicle Trajectory; 403: Individual Vehicle Origin-Destination Platooning; 404: Emergency Adjustment; 405: Event Prediction; 406: Vehicle Platooning; 407: Specific Road Segment Prediction; 408: Traffic Flow Prediction; 409: User Optimal; 410: System Optimal.

In some embodiments, e.g., as shown in FIG. 4, the technology provides a prediction and decision-making allocation system 401. In some embodiments, the prediction and decision-making allocation system divides functions into three levels (e.g., microscopic level, mesoscopic level, and/or macroscopic level). The microscopic level comprises vehicle trajectory prediction 402, individual vehicle origin and destination platooning 403, and emergency adjustment 404. The mesoscopic level includes event prediction 405, vehicle platooning 406, and specific road segment prediction 407. The macroscopic level includes traffic flow prediction 408, weather, user optimal 409, and system optimal 410.

Figure 5:
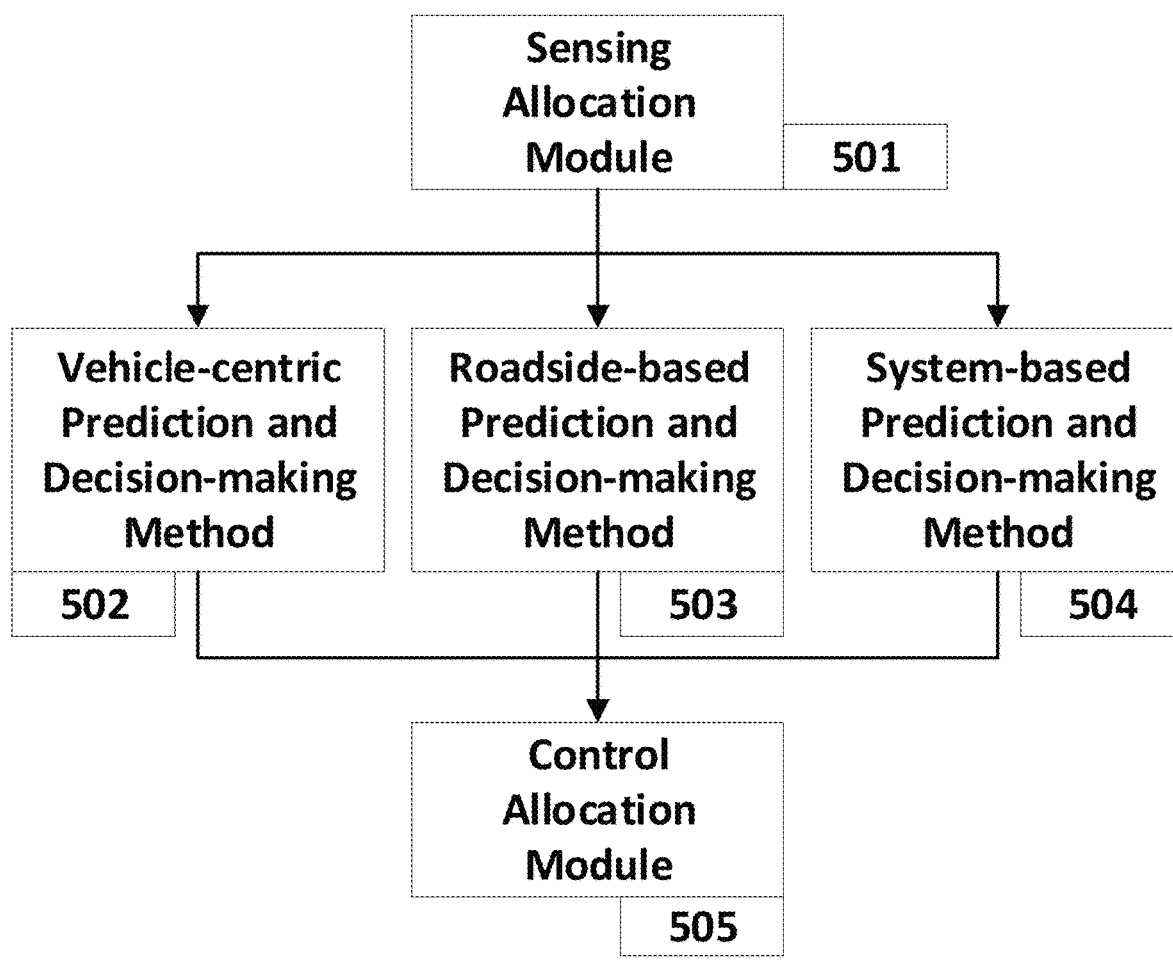
FIG. 5 is a flow diagram showing an exemplary data flow of an embodiment of a prediction and decision-making allocation method and/or system. 501: Sensing Allocation Module; 502: Vehicle-centric Prediction and Decision-making Method; 503: Roadside-based Prediction and Decision-making Method; 504: System-based Prediction and Decision-making Method; 505: Control Allocation Module.

In some embodiments, e.g., as shown in FIG. 5, the technology provides methods associated with the prediction and decision-making allocation system 501. In some embodiments, the prediction and decision-making allocation system is configured to perform a vehicle-centric method 502, a roadside-based method 503, and/or a system-based method 504 according to an allocation strategy that is produced by the intelligence infrastructure and the individual CAV. In some embodiments, the system proceeds to the control allocation module 505.

Figure 6:
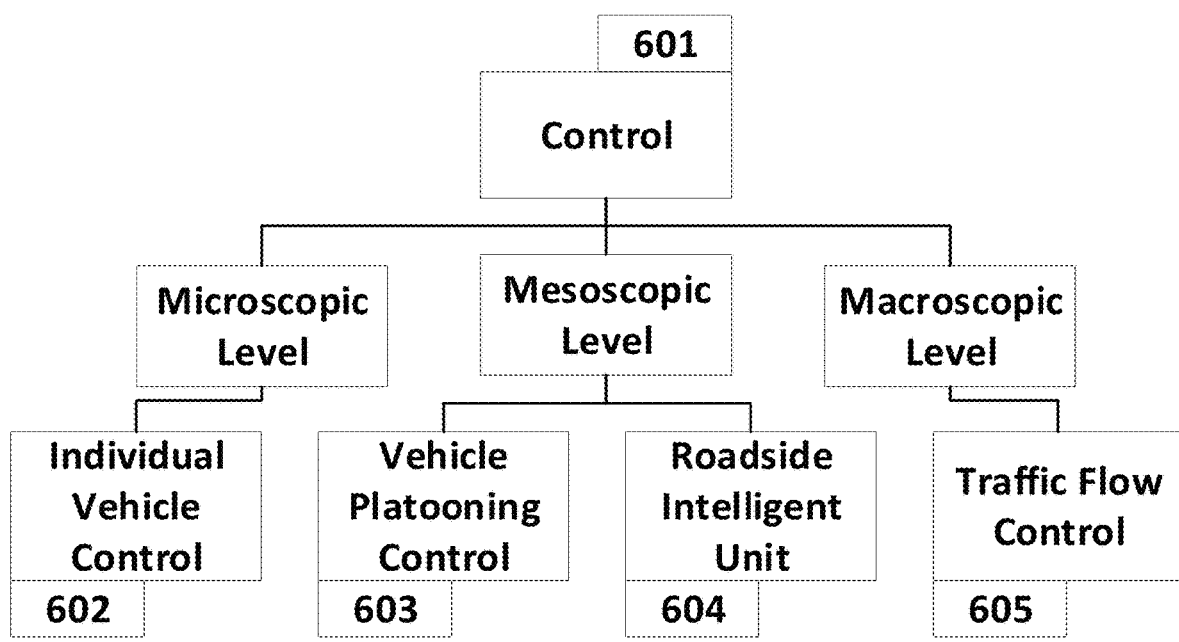
FIG. 6 is a schematic diagram showing an exemplary system structure of an embodiment of a control allocation system, e.g., comprising components and/or functions at a microscopic level, a mesoscopic level, and/or a macroscopic level. 601: Control Allocation Subsystem; 602: Individual Vehicle Control; 603: Vehicle Platooning Control; 604: Roadside Intelligent Unit; 605: Traffic Flow Control.

In some embodiments, e.g., as shown in FIG. 6, the technology provides a control allocation system 601. In some embodiments, the control allocation system divides control functions into three categories (e.g., microscopic level, mesoscopic level, and/or macroscopic level) based on the analysis of the function and its application with respect to time and space scales for vehicle management and control. The microscopic level includes individual vehicle control 602. The mesoscopic level includes vehicle platooning control 603 and roadside intelligent unit control 604. The macroscopic level includes traffic flow control 605.

Figure 7:
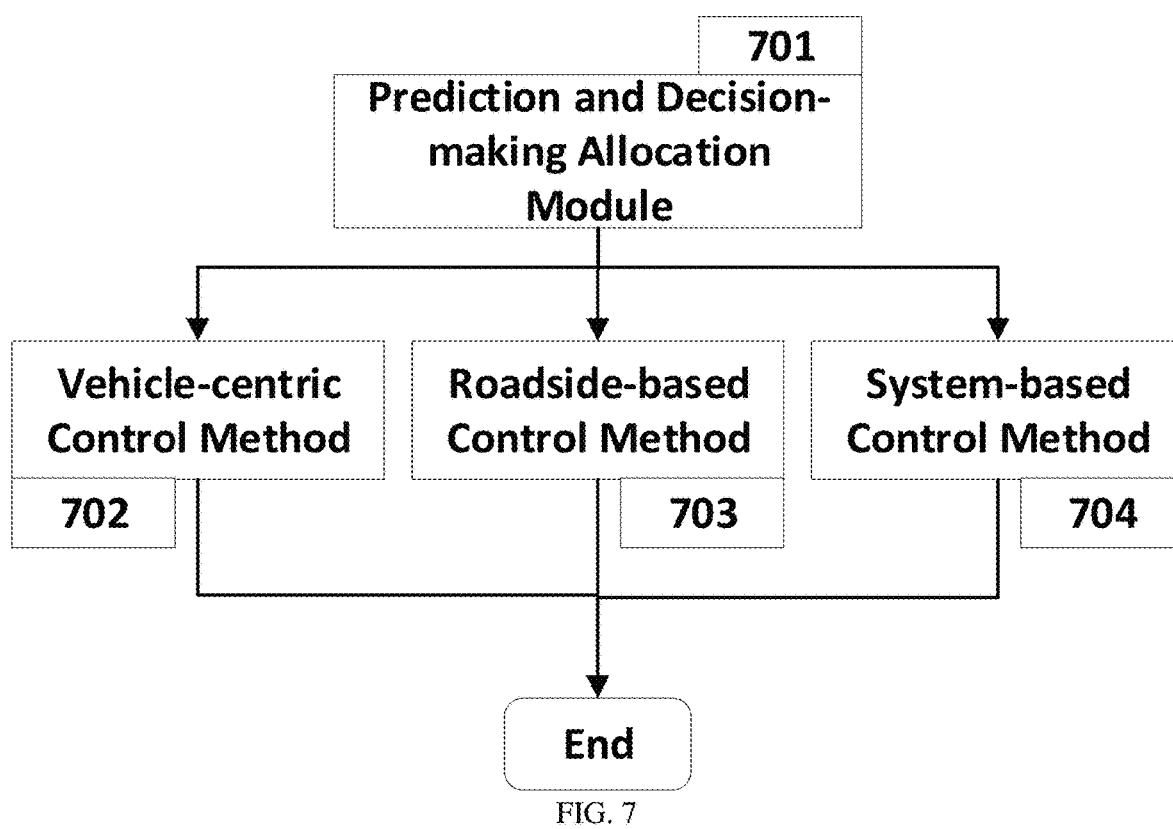
FIG. 7 is a flow diagram showing an exemplary data flow of an embodiment of a control allocation method. 701: Prediction and Decision-making Allocation Module; 702: Vehicle-centric Control Method; 703: Roadside-based Control Method; 704: System-based Control Method.

In some embodiments, e.g., as shown in FIG. 7, the technology provides methods associated with the control allocation system method 701. In some embodiments, the control allocation system is configured to perform a vehicle-centric method 702, a roadside-based method 703, and/or a system-based method 704 according to an allocation strategy that is produced by the intelligence infrastructure and the individual CAV.

Figure 8:
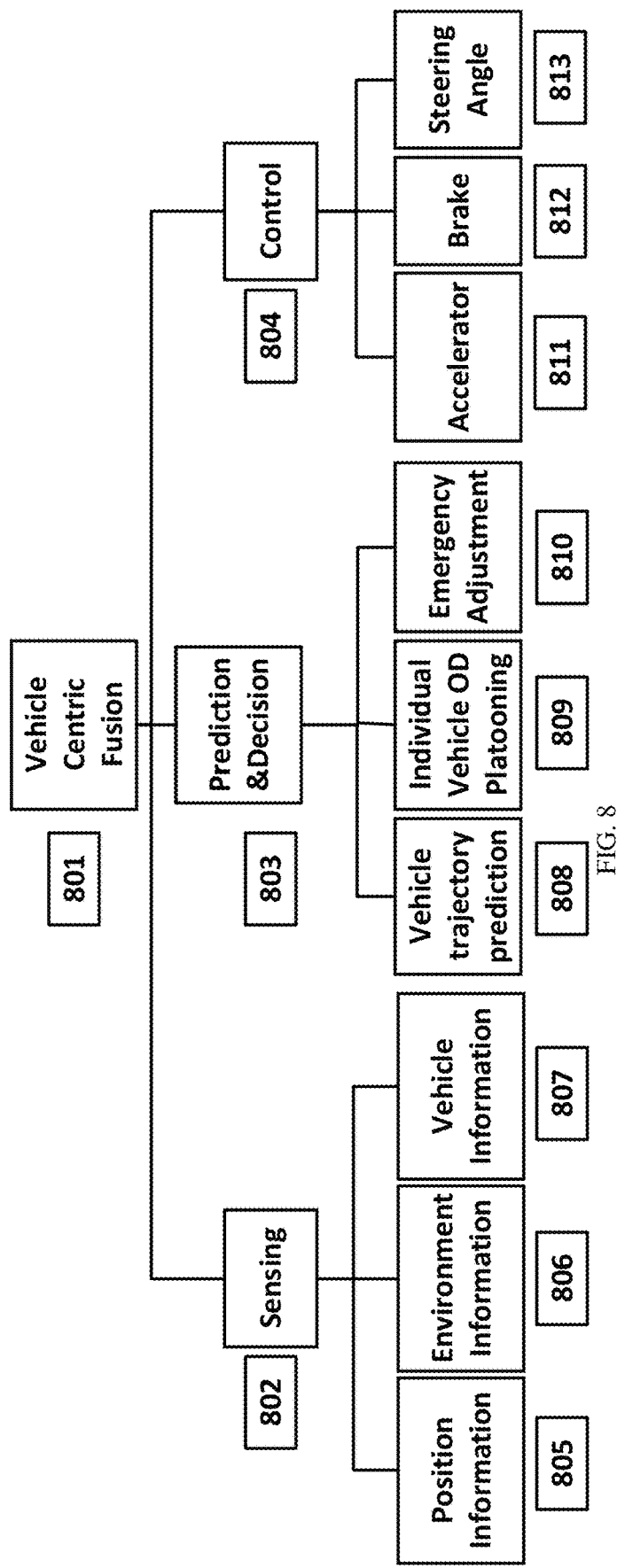
FIG. 8 is a schematic diagram showing an exemplary system structure of an embodiment of a vehicle-based fusion system. 801: Vehicle Centric Fusion; 802: Sensing component and/or function; 803: Prediction and Decision component and/or function; 804: Control component and/or function; 805: Position Information; 806: Environment Information; 807: Vehicle Information; 808: Vehicle trajectory prediction; 809: Individual Vehicle Origin and destination Platooning; 810: Emergency Adjustment; 811: Accelerator; 812: Brake; 813: Steering Angle.

In some embodiments, e.g., as shown in FIG. 8, the technology provides methods for vehicle-based fusion 801. In some embodiments, the vehicle-based fusion methods comprise steps of, e.g., sensing fusion 802, prediction and decision making fusion 803, and control fusion 804. The sensing fusion comprises position information sensing 805, environment information sensing 806, and/or vehicle information sensing 807. The prediction and decision making fusion comprises vehicle trajectory prediction 808, individual vehicle origin and destination planning 809, and/or emergency adjustment 810. The control fusion 804 comprise accelerator control 811, brake control 812, and/or steering angle control 813.

Figure 9:
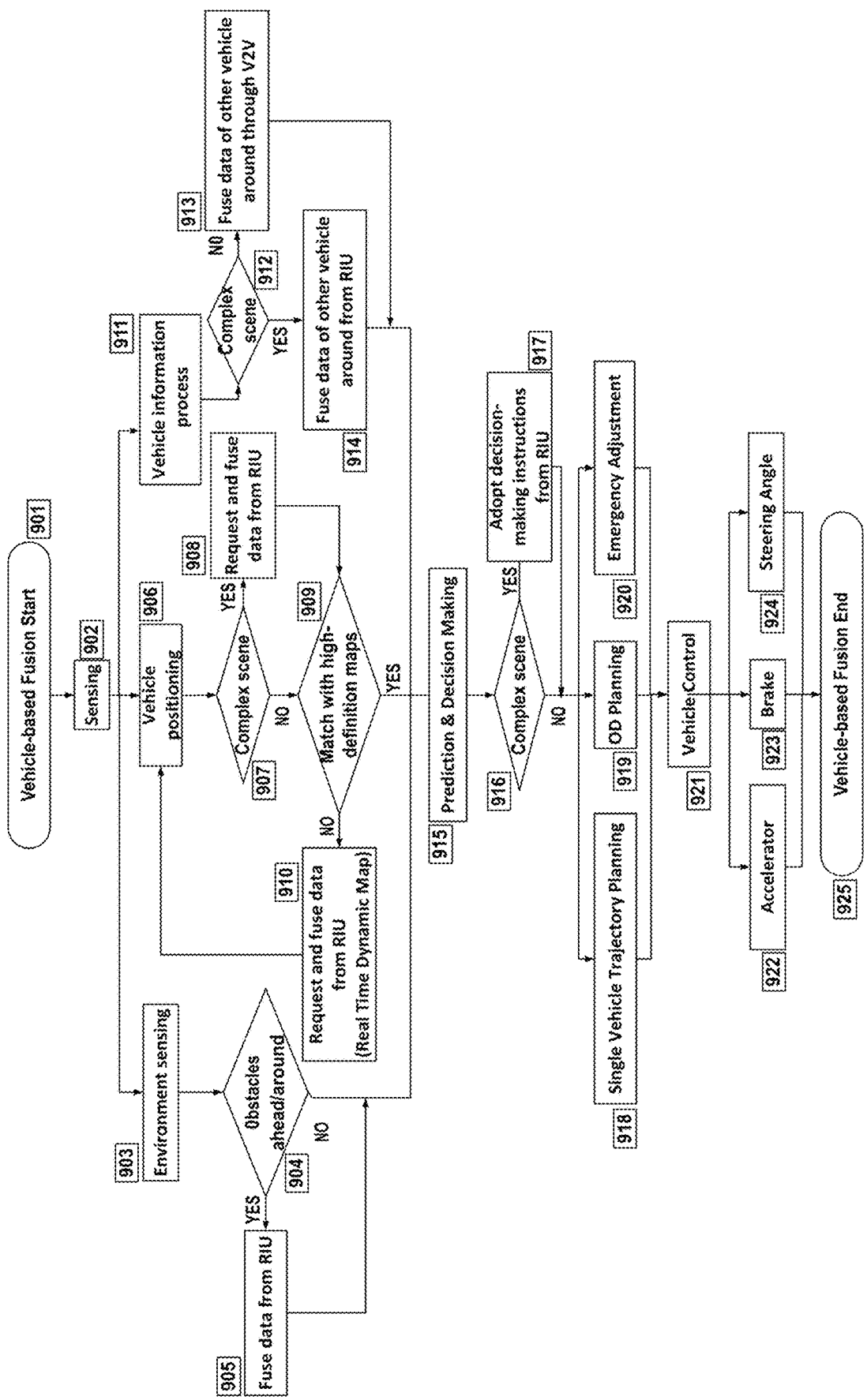
FIG. 9 is a flowchart showing an exemplary embodiment of a vehicle-based fusion method. 901: Vehicle-based Fusion method Start; 902: Sensing; 903: Environment sensing; 904: Obstacles ahead and/or around decision; 905: Fuse data from RIU; 906: Vehicle positioning; 907: Complex scene decision; 908: Request and fuse data from RIU; 909: Match with high-definition maps decision; 910: Request and fuse data from RIU (Real Time Dynamic Map); 911: Vehicle information process; 912: Complex scene decision; 913: Fuse data from other local vehicles using V2V; 914: Fuse data of local vehicles from RIU; 915: Prediction & Decision Making; 916: Complex scene decision; 917: Adopt decision-making instructions from RIU; 918: Single Vehicle Trajectory Planning; 919: Origin and destination Planning; 920: Emergency Adjustment; 921: Vehicle Control; 922: Accelerator; 923: Brake; 924: Steering Angle; 925: Vehicle-based Fusion End.

In some embodiments, e.g., as shown in FIG. 9, the technology provides methods for vehicle-based fusion 901. In some embodiments, vehicle-based fusion methods comprise a sensing process 902. When vehicles encounter a complex scene 907, 912 (e.g., heavy traffic demand, tall buildings, intersections, etc. (e.g., as provided by and/or determined from sensing data provided by the sensing process 902)), vehicles request and fuse data from RIU 908 to support vehicle positioning 906. Then, in some embodiments, the vehicle checks if the vehicle positioning matches with the information provided by the high-precision map 909. If the vehicle positions do not match, the vehicle requests data from the real-time dynamic map provided by RIU 910, fuses the data, and provides an updated position for the vehicle. In some embodiments, if there are objects and/or pedestrians 904 in front of the vehicle, the vehicle fuses related sensing data from RIU 905 to enhance the environment sensing capability 903. Simultaneously, vehicles receive data from local (e.g., surrounding) vehicles through V2V communication 913 or from the RIU and fuse vehicle information 914. Thus, the sensing process is completed and, in some embodiments, the vehicle initiates the fusion of prediction and decision making 915. In this stage, the vehicle receives and/or implements decision-making instructions from RIU 917 (e.g., if the vehicle encounters a complex scene 916). In some embodiments, according to the sensing data and/or decision-making instruction, the vehicle makes predictions and decisions (e.g., single-vehicle trajectory planning 918, origin and destination planning 919, and/or emergency adjustment 920). In some embodiments, after completing the decision-making process, the vehicle initiates the control process 921 (e.g., to provide control of the accelerator 922, brake 923, and/or steering wheel 924 based on the decision-making instructions). Then, in some embodiments, the vehicle-based fusion process ends 925.

Figure 10:
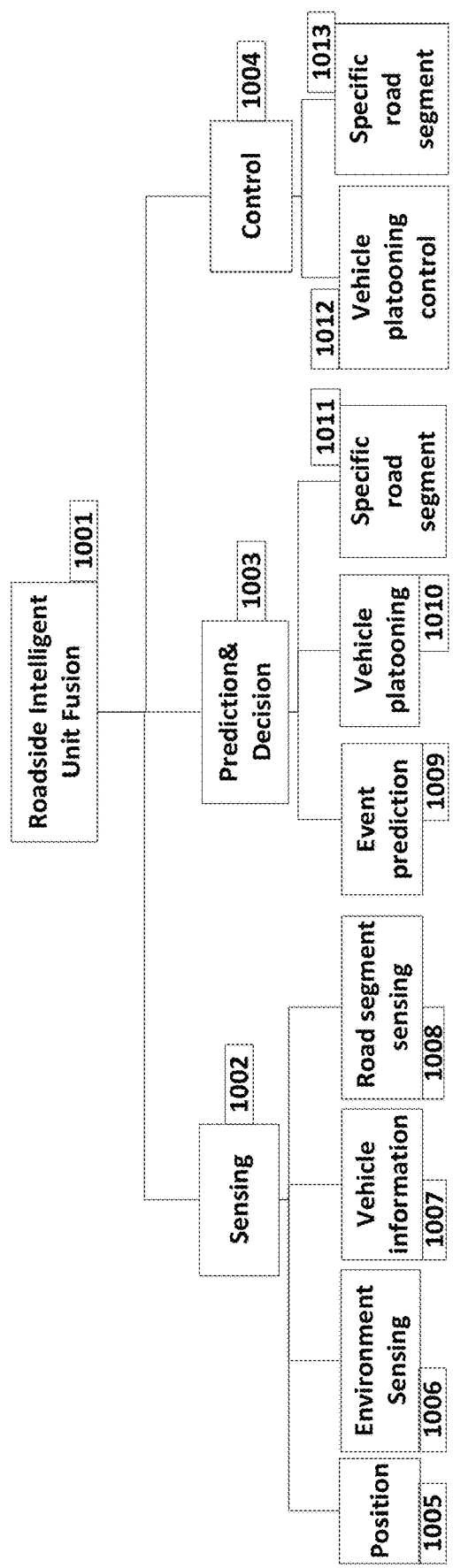
FIG. 10 is a schematic diagram showing an exemplary system structure of an embodiment of a roadside intelligent unit (RIU)-based fusion system. 1001: Roadside Intelligent Unit Fusion; 1002: Sensing component and/or function; 1003: Prediction & Decision component and/or function; 1004: Control component and/or function; 1005: Position; 1006: Environment Sensing; 1007: Vehicle Information; 1008: Road segment sensing; 1009: Event prediction; 1010: Vehicle platooning; 1011: Specific road segment; 1012: Vehicle platooning control; 1013: Specific road segment.

In some embodiments, e.g., as shown in FIG. 10, the technology provides methods for RIU-based fusion 1001. For example, in some embodiments, RIU-based fusion methods comprise steps of, e.g., sensing fusion 1002, prediction and decision fusion 1003, and control fusion 1004. In some embodiments, the sensing fusion 1002 comprises position sensing 1005, road segment environment sensing 1006, vehicle information sensing 1007, and road segment traffic flow sensing 1008. In some embodiments, the prediction and decision fusion 1003 comprises event prediction 1009, vehicle platooning 1010, and specific road segment decision making 1011. In some embodiments, the control fusion 1004 comprises vehicle platooning control 1012 and specific road segment traffic flow control 1013.

Figure 11:
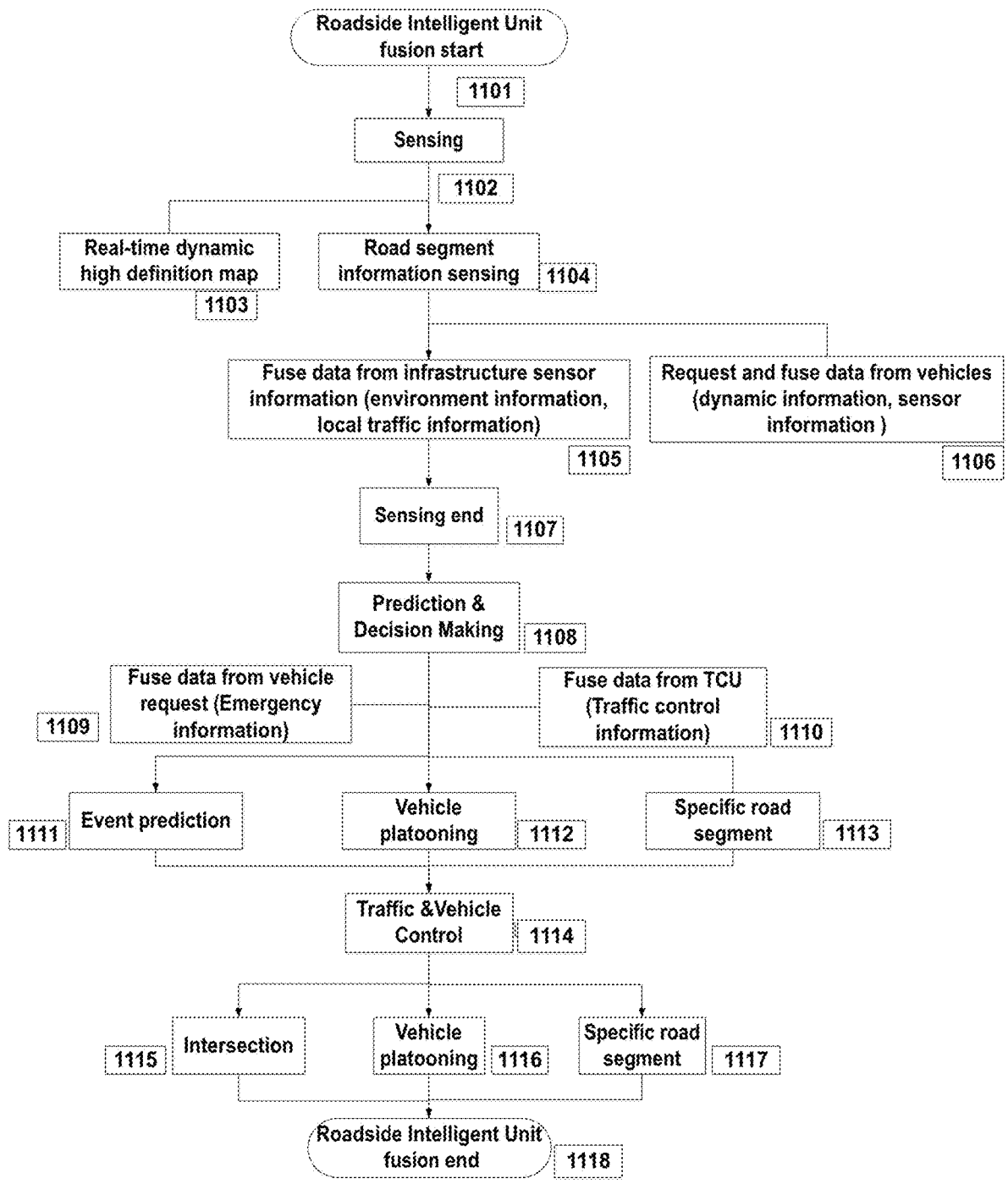
FIG. 11 is a flowchart showing an exemplary embodiment of a RIU-based fusion method. 1101: Roadside Intelligent Unit fusion method start; 1102: Sensing; 1103: Real-time dynamic high definition map; 1104: Road segment information sensing; 1105: Fuse data from infrastructure sensor information (e.g., environment information, local traffic information, etc.); 1106: Request and fuse data from vehicles (e.g., dynamic information, sensor information, etc.); 1107: Sensing end; 1108: Prediction and Decision Making; 1109: Fuse data from vehicle request (e.g., emergency information); 1110: Fuse data from Traffic Control Unit (TCU) (e.g., traffic control information); 1111: Event prediction; 1112: Vehicle platooning; 1113: Specific road segment; 1114: Traffic and Vehicle Control; 1115: Intersection; 1116: Vehicle platooning; 1117: Specific road segment; 1118: Roadside Intelligent Unit fusion method end.

In some embodiments, e.g., as shown in FIG. 11, the technology provides methods for RIU-based fusion 1101. In some embodiments, the RIU-based fusion methods comprise sensing (e.g., based on the real-time dynamic high definition map 1103), requesting data from vehicles by the RIU, and fusing vehicle data with infrastructure sensor information 1106. In some embodiments, this completes the sensing methods 1107. In some embodiments, the RIU proceeds to steps comprising fusing prediction and decision making 1108. In this stage, the RIU receives and/or implements decision-making instructions, e.g., from TCU 1110 and/or vehicle emergency information 1109. Then, in some embodiments, the RIU makes predictions and decisions (e.g., event prediction 1111, vehicle platooning 1112, and/or specific road segment 1113) according to the sensing data and decision-making instructions. In some embodiments, the RIU manages traffic and/or controls vehicles 1114 based on the decision-making instructions (e.g., after completing the decision-making process), e.g., to manage traffic and/or control vehicles at intersections, specific road segments, and/or with respect to vehicle platooning.

Figure 12:
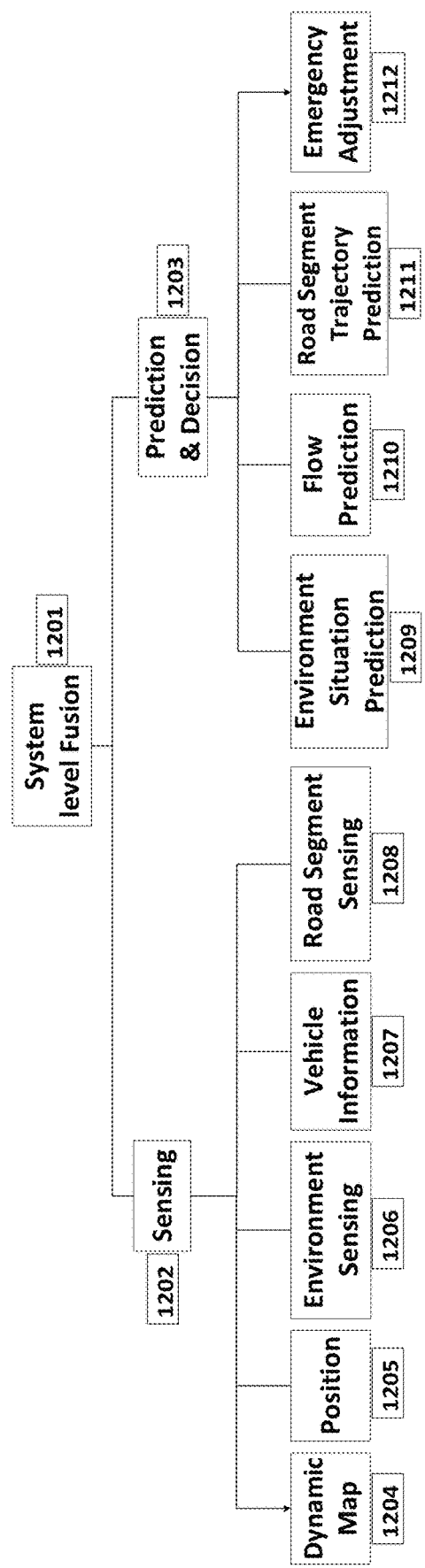
FIG. 12 is a schematic diagram showing an exemplary embodiment of a system-level fusion system. 1201: System level Fusion; 1202: Sensing component and/or function; 1203: Prediction and Decision component and/or function; 1204: Dynamic map; 1205: Position; 1206: Environment Sensing; 1207: Vehicle information; 1208: Road segment sensing; 1209: Environment situation prediction; 1210: Flow prediction; 1211: Road segment trajectory prediction; 1211: Emergency Adjustment.

In some embodiments, e.g., as shown in FIG. 12, the technology provides a system-level fusion method 1201. In some embodiments, the system-level fusion method comprises steps of a fusion process comprising sensing fusion 1202 and/or prediction and decision fusion 1203. In some embodiments, the sensing fusion comprises, e.g., dynamic map 1204, position 1205, environment sensing 1206, vehicle information 1207, and/or road segment sensing 1208. In some embodiments, the prediction and decision fusion comprises environment situation prediction 1209, flow prediction 1210, road segment trajectory prediction 1211, and/or emergency adjustment 1212.

Figure 13:
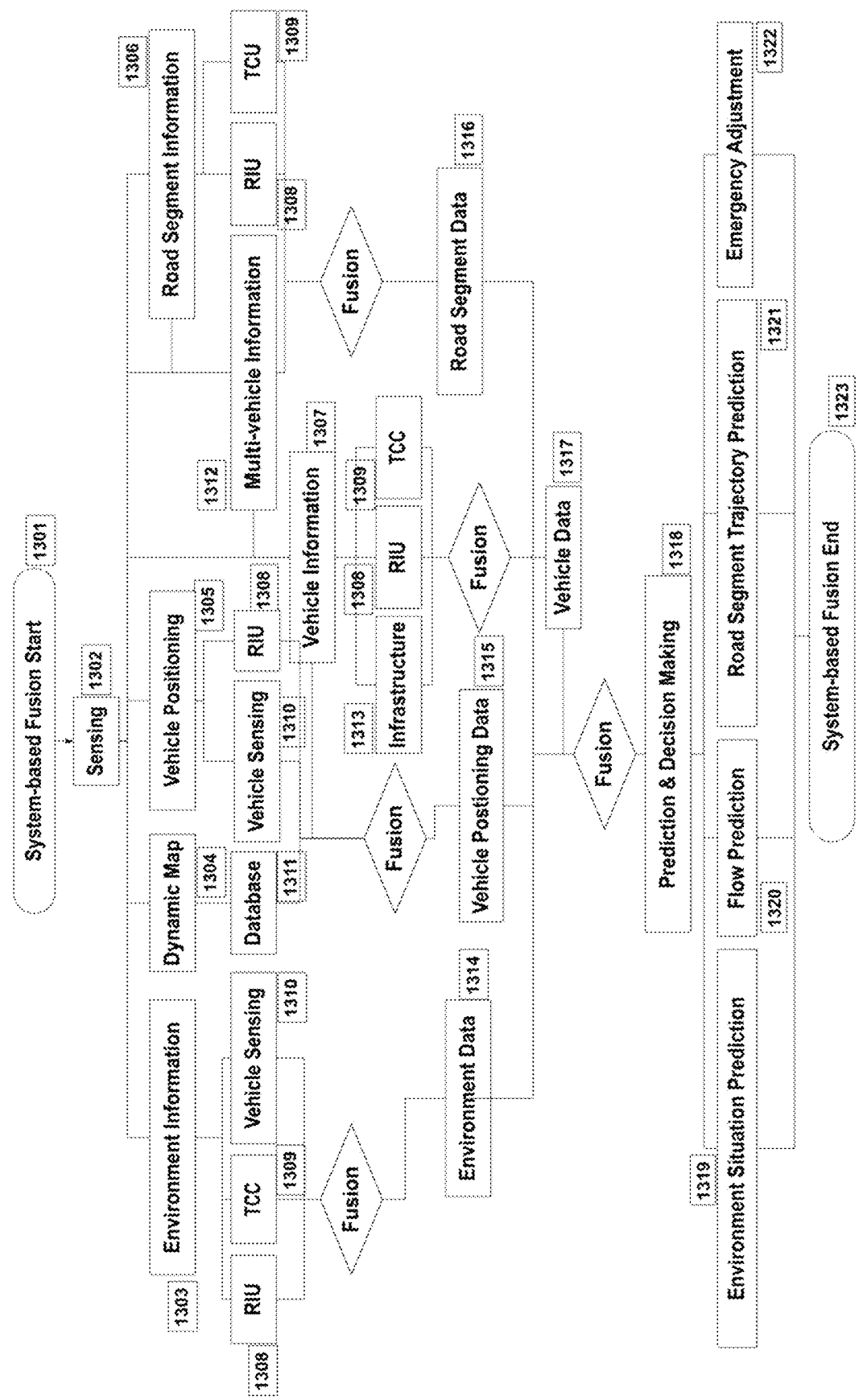
FIG. 13 is a flowchart showing an exemplary embodiment of a system-level fusion method. 1301: System Fusion method Start; 1302: Sensing; 1303: Environment information; 1304: Dynamic map; 1305: Vehicle positioning; 1306: Road segment information; 1307: Vehicle information; 1308: RIU; 1309: TCC; 1310: Vehicle sensing; 1311: Database; 1312: Multi-vehicle information; 1313: Infrastructure; 1314: Environment data; 1315: Vehicle positioning data; 1316: Road segment data; 1317: Vehicle data; 1318: Prediction and Decision Making; 1319: Environment situation prediction; 1320: Flow prediction; 1321: Road segment trajectory prediction; 1322: Emergency Adjustment; 1323: Vehicle-based Fusion method End.

In some embodiments, e.g., as shown in FIG. 13, the technology provides a method for system fusion 1301. In some embodiments, the system fusion comprises sensing 1302 steps based on environment information 1303, dynamic map 1304, vehicle positioning 1305, vehicle information 1307, and/or road segment information 1306 to provide sensing data fusion. In some embodiments, the data is provided by RIU 1308. TCC 1309, vehicle sensing 1310, and/or a database 1311. In some embodiments, the method for system fusion comprises prediction and decision making steps 1318 based on environment situation prediction 1319, flow prediction 1320, road segment trajectory prediction 1321, and/or emergency adjustment 1322 to provide prediction and decision making fusion 1323.

Figure 14:
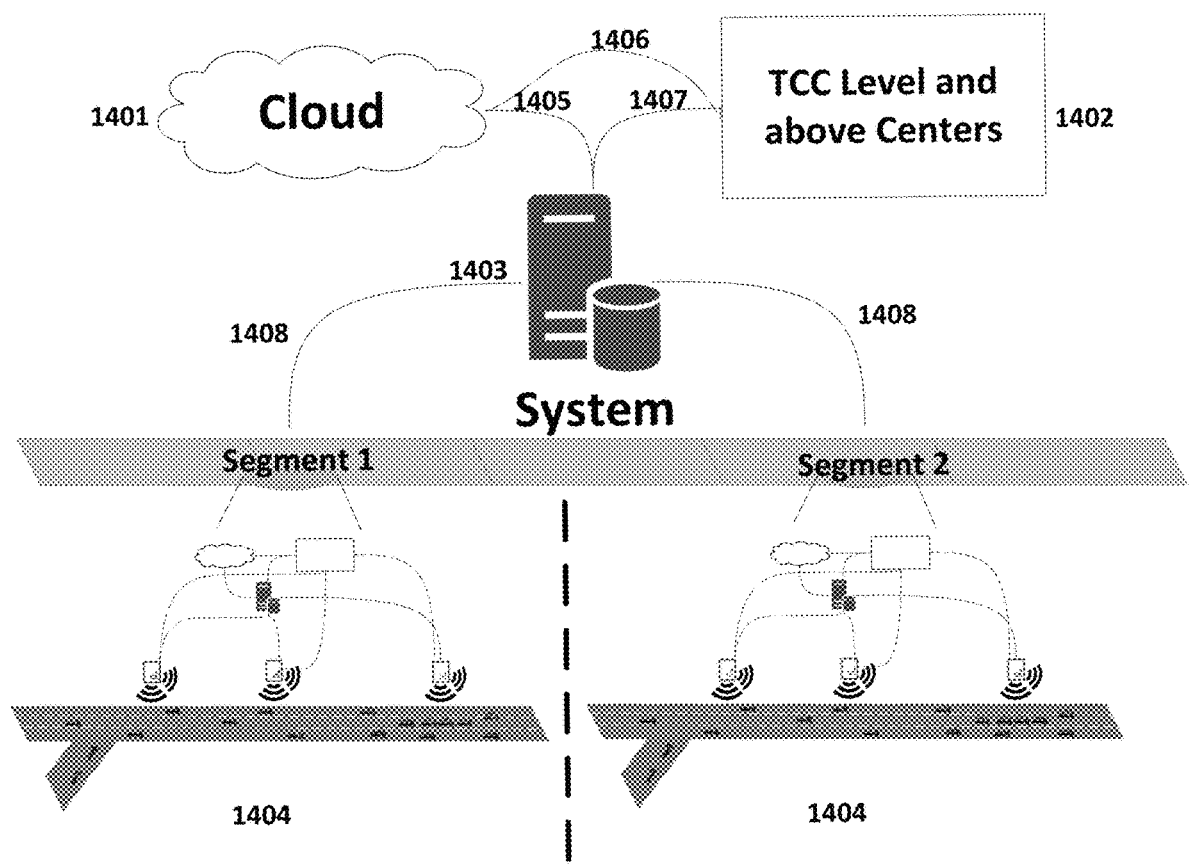
FIG. 14 is a schematic diagram showing an exemplary embodiment of components and structure providing coordinated control of the system. 1401: Cloud; 1402: Centers at the TCC Level and Above; 1403: System; 1404: Segment of Highway; 1405: Information Exchange between Cloud and System; 1406: Information Exchange between Cloud and Centers at the TCC Level and Above; 1407: Information Exchange between System and Centers at the TCC Level and Above; 1408: Information Exchange between System and Segment of Highway.

In some embodiments, e.g., as shown in FIG. 14, the technology provides coordinated control of the systems described herein. For example, in some embodiments, the highway is separated into several segments 1404. Each segment 1404 may comprise a different situation (e.g., work zone, merging traffic, accident, heavy traffic, weather, critical point, etc.). In some embodiments, the system 1403 exchanges information 1405, 1406, 1407 among cloud 1401 and centers at the TCC level and above 1402 and collects data from each segment 1404 to provide coordinated control for the highway.

Figure 15:
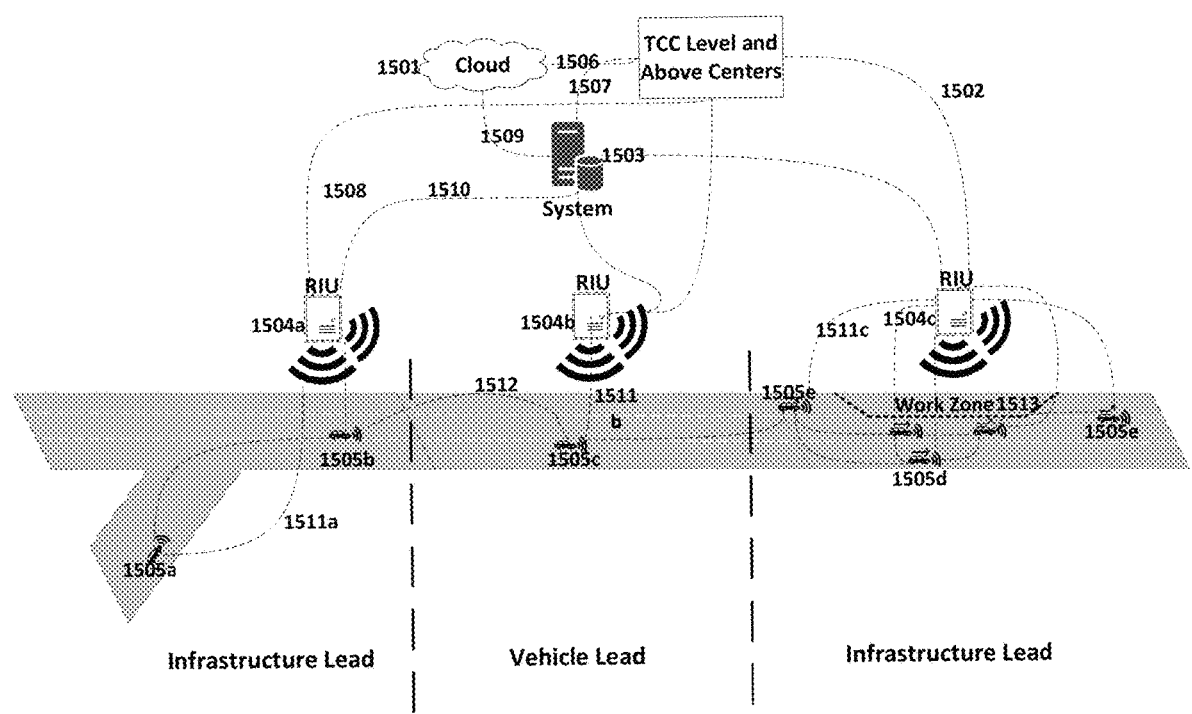
FIG. 15 is a schematic diagram showing an exemplary embodiment of cooperative control for vehicles and infrastructure for a segment of highway. 1501: Cloud; 1502: Centers at TCC Level and Above; 1503: System; 1504*a*, 1504*b*, 1504*c*: Transportation Infrastructure (e.g., Roadside Intelligent Unit (RIU)); 1505*a*, 1505*b*, 1505*c*, 1505*d*, 1505*e*: CAV; 1506: Information Exchange between Cloud and Centers at the TCC Level and Above; 1507: Information Exchange between System and Centers at the TCC Level and Above; 1508: Information Exchange between Infrastructure and Centers at the TCC Level and Above; 1509: Information Exchange between System and Cloud; 1510: Information Exchange between System and Infrastructure; 1511*a*, 1511*b*, 1511*c*: I2V, V2I: 1512: V2V; 1513: Work Zone.

In some embodiments, e.g., as shown in FIG. 15, the technology provides coordinated and/or cooperative control for vehicles and infrastructure in a segment of the highway. For example, in some embodiments, the system 1503 exchanges information among cloud 1501 and centers at TCC level and above 1502, 1506, 1507, 1509. Further, in some embodiments, the infrastructure 1504 collects data from centers at TCC level and above 1502, 1508 and system 1503, 1510; senses objects and vehicles 1505 on the highway; and shares information with vehicles 1505, 1511. In some embodiments, vehicles 1505 connect with each other to share information 1512. In some embodiments, vehicles 1505*b* control themselves using supplemental support from the infrastructure 1504*b*. However, in a complex situation (e.g., merging traffic, work zone 1513, critical point, accident, heavy traffic, weather, etc.), the infrastructure 1504*a*, 1504*c* assumes priority for vehicle control using supplemental support from the vehicles 1505*a* to help vehicles 1505*a* merge into traffic flow or to coordinate vehicle control 1505*c*, e.g., to manage lane changing for vehicles.

Automated Driving Systems (ADS)

In some embodiments, the technology provides function allocation for a vehicle operations and control system (e.g., an automated driving system (ADS) and technologies as described herein). In some embodiments, the ADS comprises one or more of a roadside intelligent unit (RIU) network; a Traffic Control Unit (TCU) and Traffic Control Center (TCC) network (e.g., TCU/TCC network); a vehicle comprising an onboard intelligent unit (OIU); and/or a Traffic Operations Center (TOC). In some embodiments, the ADS is provided as a connected and automated vehicle highway (CAVH) system, e.g., comprising one or more components of an intelligent road infrastructure system (see, e.g., U.S. patent application Ser. No. 16/267,836 and U.S. Pat. No. 10,380,886, each of which is incorporated herein by reference). In some embodiments, the ADS is provided as or supports a distributed driving system (DDS), intelligent roadside toolbox (IRT), and/or device allocation system (DAS) (see, e.g., U.S. Pat. App. Ser. Nos. 62/894,703; 63/004,551; and 63/004,564, each of which is incorporated herein by reference. In some embodiments, the term "roadside intelligent unit" and its abbreviation "RIU" are used to refer to the components named a "roadside unit" and its abbreviation "RSU", respectively, as described for the CAVH technology in, e.g., U.S. patent application Ser. No. 16/267,836 and U.S. Pat. No. 10,380,886, each of which is incorporated herein by reference. In some embodiments, the term "onboard intelligent unit" and its abbreviation "OI U" are used to refer to the components named an "onboard unit" and its abbreviation "OBU", respectively, as described for the CAVH technology in. e.g., U.S. patent application Ser. No. 16/267,836 and U.S. Pat. No. 10,380,886, each of which is incorporated herein by reference.

In some embodiments, the technology provides a system (e.g., a vehicle operations and control system comprising a RIU and/or an RIU network; a TCU/TCC network; a vehicle comprising an onboard intelligent unit; a TOC and/or a cloud-based platform configured to provide information and computing services (see, e.g., U.S. patent application Ser. No. 16/454,268, incorporated herein by reference)) configured to provide sensing functions, transportation behavior prediction and management functions, planning and decision making functions, and/or vehicle control functions. In some embodiments, the system comprises wired and/or wireless communications media. In some embodiments, the system comprises a power supply network. In some embodiments, the system comprises a cyber-safety and security system. In some embodiments, the system comprises a real-time communication function.

In some embodiments, the RIU network of embodiments of the systems provided herein comprises an RIU subsystem. In some embodiments, the RIU subsystem comprises a sensing module configured to measure characteristics of the driving environment; a communication module configured to communicate with vehicles, TCUs, and the cloud; a data processing module configured to process, fuse, and compute data from the sensing and/or communication modules; an interface module configured to communicate between the data processing module and the communication module; and an adaptive power supply module configured to provide power and to adjust power according to the conditions of the local power grid. In some embodiments, the adaptive power supply module is configured to provide backup redundancy. In some embodiments, the communication module communicates using wired or wireless media.

In some embodiments, the sensing module comprises a radar based sensor. In some embodiments, the sensing module comprises a vision based sensor. In some embodiments, the sensing module comprises a radar based sensor and a vision based sensor and wherein the vision based sensor and the radar based sensor are configured to sense the driving environment and vehicle attribute data. In some embodiments, the radar based sensor is a LIDAR, microwave radar, ultrasonic radar, or millimeter radar. In some embodiments, the vision based sensor is a camera, infrared camera, or thermal camera. In some embodiments, the camera is a color camera.

In some embodiments, the sensing module comprises a satellite based navigation system. In some embodiments, the sensing module comprises an inertial navigation system. In some embodiments, the sensing module comprises a satellite based navigation system and an inertial navigation system and the sensing module and/or the inertial navigation system are configured to provide vehicle location data. In some embodiments, the satellite based navigation system is a Differential Global Positioning Systems (DGPS), a BeiDou Navigation Satellite System (BDS) System, or a GLONASS Global Navigation Satellite System. In some embodiments, the inertial navigation system comprises an inertial reference unit.

In some embodiments, the sensing module comprises a vehicle identification device. In some embodiments, the vehicle identification device comprises RFID, Bluetooth, Wi-fi (IEEE 802.11), or a cellular network radio, e.g., a 4G or 5G cellular network radio.

In some embodiments, the RIU subsystem is deployed at a fixed location near a road comprising automated lanes and, optionally, human-driven lanes. In some embodiments, the RIU subsystem is deployed at a fixed location near road infrastructure. In some embodiments, the RIU subsystem is deployed near a highway roadside, a highway onramp, a highway offramp, an interchange, intersection, a bridge, a tunnel, a toll station, or on a drone over a critical location. In some embodiments, the RIU subsystem is deployed on a mobile component. In some embodiments, the RIU subsystem is deployed on a vehicle drone over a critical location, on an unmanned aerial vehicle (UAV), at a site of traffic congestion, at a site of a traffic accident, at a site of highway construction, at a site of extreme weather. In some embodiments, an RIU subsystem is positioned according to road geometry, traffic amount, traffic capacity, vehicle type using a road, road size, and/or geography of the area. In some embodiments, the RIU subsystem is installed on a gantry (e.g., an overhead assembly, e.g., on which highway signs or signals are mounted). In some embodiments, the RIU subsystem is installed using a single cantilever or dual cantilever support.

In some embodiments, the TCC network is configured to provide traffic operation optimization, data processing and archiving. In some embodiments, the TCC network comprises a human operations interface. In some embodiments, the TCC network is a macroscopic TCC, a regional TCC, or a corridor TCC based on the geographical area covered by the TCC network. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the TCU network is configured to provide real-time vehicle control and data processing. In some embodiments, the real-time vehicle control and data processing are automated based on preinstalled algorithms. In some embodiments, the TCU network is a segment TCU or a point TCUs based on based on the geographical area covered by the TCU network. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference. In some embodiments, the system comprises a point TCU physically combined or integrated with an RIU. In some embodiments, the system comprises a segment TCU physically combined or integrated with a RIU.

In some embodiments, the TCC network comprises macroscopic TCCs configured to process information from regional TCCs and provide control targets to regional TCCs; regional TCCs configured to process information from corridor TCCs and provide control targets to corridor TCCs; and corridor TCCs configured to process information from macroscopic and segment TCUs and provide control targets to segment TCUs. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the TCU network comprises segment TCUs configured to process information from corridor and/or point. TOCs and provide control targets to point TCUs; and point TCUs configured to process information from the segment TCU and RIUs and provide vehicle-based control instructions to an RIU. See, e.g., U.S. Pat. No. 10,380,886; U.S. Pat. App. Pub. No. 20190244521; U.S. Pat. App. Pub. No. 20190096238; U.S. patent application Ser. No. 16/454,268; and U.S. patent application Ser. No. 16/505,034, each of which is incorporated herein by reference.

In some embodiments, the RIU network provides vehicles with customized traffic information and control instructions and receives information provided by vehicles.

In some embodiments, the TCC network comprises one or more TCCs comprising a connection and data exchange module configured to provide data connection and exchange between TCCs. In some embodiments, the connection and data exchange module comprises a software component providing data rectify, data format convert, firewall, encryption, and decryption methods. In some embodiments, the TCC network comprises one or more TCCs comprising a transmission and network module configured to provide communication methods for data exchange between TCCs. In some embodiments, the transmission and network module comprises a software component providing an access function and data conversion between different transmission networks within the cloud platform. In some embodiments, the TCC network comprises one or more TCCs comprising a service management module configured to provide data storage, data searching, data analysis, information security, privacy protection, and network management functions. In some embodiments, the TCC network comprises one or more TCCs comprising an application module configured to provide management and control of the TCC network. In some embodiments, the application module is configured to manage cooperative control of vehicles and roads, system monitoring, emergency services, and human and device interaction.

In some embodiments, TCU network comprises one or more TCUs comprising a sensor and control module configured to provide the sensing and control functions of an RIU. In some embodiments, the sensor and control module is configured to provide the sensing and control functions of radar, camera, RFID, and/or V2I (vehicle-to-infrastructure) equipment. In some embodiments, the sensor and control module comprises a DSRC, GPS, 4G, 5G, and/or wireless (e.g., IEEE 802.11) radio. In some embodiments, the TCU network comprises one or more TCUs comprising a transmission and network module configured to provide communication network function for data exchange between an automated vehicles and a RIU. In some embodiments, the TCU network comprises one or more TCUs comprising a service management module configured to provide data storage, data searching, data analysis, information security, privacy protection, and network management. In some embodiments, the TCU network comprises one or more TCUs comprising an application module configured to provide management and control methods of an RIU. In some embodiments, the management and control methods of an RIU comprise local cooperative control of vehicles and roads, system monitoring, and emergency service. In some embodiments, the TCC network comprises one or more TCCs further comprising an application module and the service management module provides data analysis for the application module. In some embodiments, the TCU network comprises one or more TCUs further comprising an application module and the service management module provides data analysis for the application module.

In some embodiments, the TOC comprises interactive interfaces. In some embodiments, the interactive interfaces provide control of the TCC network and data exchange. In some embodiments, the interactive interfaces comprise information sharing interfaces and vehicle control interfaces. In some embodiments, the information sharing interfaces comprise an interface that shares and obtains traffic data; an interface that shares and obtains traffic incidents; an interface that shares and obtains passenger demand patterns from shared mobility systems; an interface that dynamically adjusts prices according to instructions given by the vehicle operations and control system; and/or an interface that allows a special agency (e.g., a vehicle administrative office or police) to delete, change, and share information. In some embodiments, the vehicle control interfaces comprise an interface that allows a vehicle operations and control system to assume control of vehicles; an interface that allows vehicles to form a platoon with other vehicles; and/or an interface that allows a special agency (e.g., a vehicle administrative office or police) to assume control of a vehicle. In some embodiments, the traffic data comprises vehicle density, vehicle velocity, and/or vehicle trajectory. In some embodiments, the traffic data is provided by the vehicle operations and control system and/or other shared mobility systems. In some embodiments, traffic incidents comprise extreme conditions, major and/or minor accident, and/or a natural disaster. In some embodiments, an interface allows the vehicle operations and control system to assume control of vehicles upon occurrence of a traffic event, extreme weather, or pavement breakdown when alerted by the vehicle operations and control system and/or other share mobility systems. In some embodiments, an interface allows vehicles to form a platoon with other vehicles when they are driving in the same automated vehicle dedicated lane.

In some embodiments, the OIU comprises a communication module configured to communicate with an RIU. In some embodiments, the OIU comprises a communication module configured to communicate with another OIU. In some embodiments, the OIU comprises a data collection module configured to collect data from external vehicle sensors and internal vehicle sensors; and to monitor vehicle status and driver status. In some embodiments, the OIU comprises a vehicle control module configured to execute control instructions for driving tasks. In some embodiments, the driving tasks comprise car following and/or lane changing. In some embodiments, the control instructions are received from an RIU. In some embodiments, the OIU is configured to control a vehicle using data received from an RIU. In some embodiments, the data received from the RIU comprises: vehicle control instructions; travel route and traffic information; and/or services information. In some embodiments, the vehicle control instructions comprise a longitudinal acceleration rate, a lateral acceleration rate, and/or a vehicle orientation. In some embodiments, the travel route and traffic information comprise traffic conditions, incident location, intersection location, entrance location, and/or exit location. In some embodiments, the services data comprises the location of a fuel station and/or location of a point of interest. In some embodiments, OIU is configured to send data to an RIU. In some embodiments, the data sent to the RIU comprises driver input data; driver condition data; and/or vehicle condition data. In some embodiments, the driver input data comprises origin of the trip, destination of the trip, expected travel time, and/or service requests. In some embodiments, the driver condition data comprises driver behaviors, fatigue level, and/or driver distractions. In some embodiments, the vehicle condition data comprises vehicle ID, vehicle type, and/or data collected by a data collection module.

In some embodiments, the OIU is configured to collecting data comprising vehicle engine status; vehicle speed; surrounding objects detected by vehicles; and/or driver conditions. In some embodiments, the OIU is configured to assume control of a vehicle. In some embodiments, the OIU is configured to assume control of a vehicle when the automated driving system fails. In some embodiments, the OIU is configured to assume control of a vehicle when the vehicle condition and/or traffic condition prevents the automated driving system from driving the vehicle. In some embodiments, the vehicle condition and/or traffic condition is adverse weather conditions, a traffic incident, a system failure, and/or a communication failure.

Function Allocation

In some embodiments, the technology relates to function allocation for an ADS. In some embodiments, the technology provides function allocation subsystems, e.g., a sensing allocation system; a prediction and decision-making allocation system; and a control allocation system. In some embodiments, the system also provides four categories of fusion methods to support the allocation systems, including Raw Data Fusion. Prediction Coordination, Decision Coordination, and Coordinated Control. See, e.g., Table 1. Table 1 subdivides each function into microscopic, mesoscopic, and/or macroscopic levels based on time and space resolution and indicates allocations of functions to the vehicle, the infrastructure, and the AIDS. The functions that allocated to the vehicle are defined as V; the functions that allocated to the infrastructure are defined as I; and the functions that are allocated to the system are defined as S.

TABLE 1

Intelligence levels and function allocation

| Function | Level | | | | V | I | S |
|---|---|---|---|---|---|---|---|
| Sensing | Microscopic | Positioning | High-precision Positioning | Vehicle Self Positioning | ✓ | | ✓ |
| | | | | Infrastructure Support Positioning | | ✓ | ✓ |
| | | | HD Map | Static Map | ✓ | | ✓ |
| | | | | Real-Time Dynamic Map | | ✓ | ✓ |
| | | | Environment Sensing | Vehicle | ✓ | | ✓ |
| | | | | Pedestrians and Objects | | ✓ | ✓ |
| | | | Vehicle Information | Vehicle Information | ✓ | | ✓ |
| | | | | Other Vehicles Information | | ✓ | ✓ |
| | Mesoscopic | Multi-vehicle and Road Segment Sensing | Vehicle Dominance Segment Sensing | | ✓ | | ✓ |
| | | | Infrastructure Dominance Segment Sensing | | | ✓ | ✓ |
| | Macroscopic | Traffic Control Center (TCC) Sensing and Traffic Flow Sensing | | | | ✓ | ✓ |
| | | Raw Data Fusion | | | | | ✓ |
| Prediction and Decision Making | Microscopic | Single Vehicle Trajectory Planning | | | ✓ | | ✓ |
| | | Single Vehicle OD Planning | | | ✓ | | ✓ |
| | | Emergency Adjustment | | | ✓ | | ✓ |
| | Mesoscopic | Events | Accident | | | ✓ | ✓ |
| | | | Work Zone | | | ✓ | ✓ |
| | | | Traffic Control | | | ✓ | ✓ |
| | | Platoon | | | | ✓ | ✓ |
| | | Specific Road Segment Prediction | | | | ✓ | ✓ |
| | Macroscopic | Traffic Flow Prediction | | | | ✓ | ✓ |
| | | Weather | | | | ✓ | ✓ |
| | | Optimization | User Optimal | | ✓ | | ✓ |
| | | | System Optimal | | | | ✓ |
| | | Prediction Coordination | | | | | ✓ |
| | | Decision Coordination | | | | | ✓ |
| Control | Microscopic | Individual Vehicle Control | | | ✓ | | ✓ |

TABLE 1-continued

Intelligence levels and function allocation

| Function | Level | | V | I | S |
|---|---|---|---|---|---|
| | Mesoscopic | Platoon Control | | ✓ | ✓ |
| | | Roadside Intelligent Unit Control | | ✓ | ✓ |
| | Macroscopic | Traffic How Control | | ✓ | ✓ |
| | | Coordinated Control | | | ✓ |

In particular embodiments, the technology provides a system comprising three function allocation subsystems: a sensing allocation system; a prediction and decision-making allocation system; and a control allocation system.

For example, in some embodiments, the sensing allocation system comprises a structure in which sensing functions are allocated at microscopic, mesoscopic, and/or macroscopic levels (e.g., according to resolution in time and/or space). In some embodiments, the microscopic level provides a high-definition (HD) map, high-precision positioning, environment sensing, and/or vehicle information sensing. In some embodiments, the HD map provides an onboard static map allocated to the vehicle and/or a real-time dynamic map allocated to the infrastructure. In some embodiments, the high-precision positioning is subdivided to provide vehicle self-positioning allocated to the vehicle and/or infrastructure support positioning allocated to the infrastructure. In some embodiments, environment sensing is subdivided to provide sensing vehicles allocated to the vehicle and/or sensing pedestrians and/or objects allocated to the infrastructure. In some embodiments, vehicle information sensing is subdivided to provide vehicle self-information allocated to the vehicle and/or other-vehicle information (e.g., information about other vehicles that are not said vehicle having self-information) allocated to the infrastructure. In some embodiments, the mesoscopic level provides multi-vehicle and/or road segment sensing, which is subdivided to provide vehicle-dominant segment sensing allocated to the vehicle and/or infrastructure-dominant segment sensing allocated to the infrastructure. In some embodiments, the macroscopic level provides traffic control center (TCC) sensing and/or traffic flow sensing, both of which are allocated to the infrastructure. In some embodiments, the sensing functions are assigned to CAVs and/or intelligent infrastructures based on an allocation strategy (e.g., a preset allocation strategy).

Further, in some embodiments, the prediction and decision-making allocation system comprises a structure in which prediction and decision-making functions are allocated at the microscopic, mesoscopic, and/or macroscopic levels (e.g., according to resolution in time and/or space). For example, in some embodiments, the prediction and decision-making allocation system at the microscopic level allocates vehicle trajectory prediction, individual vehicle origin and destination planning, and/or emergency adjustment to vehicles. In some embodiments, the prediction and decision-making allocation system at the mesoscopic level allocates event prediction (e.g., accident, work zone, and/or traffic control), vehicle platooning, and/or specific road segment prediction to the infrastructure. In some embodiments, the prediction and decision-making allocation system at the macroscopic level allocates traffic flow prediction to the infrastructure, allocates weather (e.g., collecting weather information and evaluating weather effects on vehicles and/or traffic) to the infrastructure, allocates determining user-optimal traffic routing to vehicles, and/or allocates system-optimal traffic routing to the system.

Further, in some embodiments, the control allocation system comprises a structure in which control functions are allocated at the microscopic, mesoscopic, and/or macroscopic levels (e.g., according to resolution in time and/or space). In some embodiments, the control allocation system at the microscopic level allocates individual vehicle control to vehicles. In some embodiments, the control allocation system at the mesoscopic level allocates vehicle platooning control and/or roadside intelligent unit control to the infrastructure. In some embodiments, the control allocation system at the macroscopic level allocates traffic flow control to the infrastructure.

In some embodiments, the system provides fusion functions and/or methods to support the allocation systems described herein. For example, in some embodiments, the system provides fusion functions and/or methods for raw data fusion, prediction coordination, decision coordination, and coordinated control.

In some embodiments, the technology relates to allocating functions between vehicles (e.g., CAV) and infrastructure to provide a system (e.g., comprising the vehicles and infrastructure) that operates at a higher intelligence and/or automated driving level than is provided by the vehicles or infrastructure alone without allocating functions between vehicles and infrastructure. For instance, in some embodiments, the technology that relates to allocating functions between vehicles (e.g., CAV) operating at an intelligence and/or automation level V and infrastructure operating at an intelligence and/or automation level I to provide a system (e.g., comprising the vehicles and infrastructure) that operates at an intelligence level S that is greater than V and/or that is greater than I (e.g., in some embodiments, S>V AND S>I; in some embodiments, S>V OR S>I).

In particular embodiments, vehicle (e.g., CAV) operate at Level 2 intelligence and/or automated driving (V2), which is characterized by V2V and driving assistance. At V2, a CAV positions itself with high precision relative to other vehicles using V2V communication and an onboard static map. Based on the high-precision position, the CAV conducts optimal individual vehicle trajectory planning, origin and destination planning, prediction, and/or emergency adjustment. Further, in some embodiments, the infrastructure operates at Level 2 intelligence and/or automated driving (I2), which is characterized by I2X and vehicle guidance for driving assistance. At I2, the infrastructure detects pavement conditions, pedestrians, objects, and/or vehicle kinematics (e.g., lateral and/or longitudinal position, lateral and/or longitudinal speed, and/or lateral and/or longitudinal acceleration) on a time scale of seconds, which is used to update a real-time dynamic map. The infrastructure obtains data (e.g., traffic data) from RIU, TCC, and/or other sources and fuses the data from these sources to provide comprehensive information (e.g., traffic information). The infrastructure also supports prediction and decision-making for special situations (e.g., special events, extreme weather, special road section, etc.) and provides control suggestions, especially for platoon control, road segment control, and traffic flow control. Embodiments of the technology provided herein allocates functions between vehicles (e.g., CAV operating at V2) and infrastructure (e.g., operating at I2) to provide an ADS that operates at intelligence and/or automated driving level 3 (S3), which is characterized by conditional system automation. At S3, the entire system (e.g., ADS) fuses information from vehicles and the infrastructure to facilitate conditional CAV automatic driving for the system.

Although the disclosure herein refers to certain illustrated embodiments, it is to be understood that these embodiments are presented by way of example and not by way of limitation.

Example

The technology provides function allocation between vehicles and infrastructure to provide improved capabilities to an automated driving system. During the development of embodiments of the technology provided herein, specifications and performance characteristics of the technology were identified.

LIDAR

Embodiments of the technology comprise use of LIDAR. In exemplary embodiments, the technology comprises use of LIDAR hardware providing rapid scanning over a 360° field of view and having an effective detection distance greater than 50 m with a detection error of 5 cm at 99% confidence. Some commercial LIDAR hardware products may find use in embodiments of the technology provided herein, e.g., R-Fans_15 from Beijing Surestar Technology Co., Ltd (www.isurestar.com/index.php/en-product-product.html#9), TDC-GPX2 LIDAR from precision-measurement-technologies (pmt-fl.com), and HDL-64E from Velodyne Lidar (velodynelidar.com/index.html). In exemplary embodiments, the technology comprises use of LIDAR software that measures the distance between two vehicles, measures the distance between carriageway markings and vehicles, and/or that measures the angle of vehicles with respect to central lines. Some commercial LIDAR software products may find use in embodiments of the technology provided herein, e.g., LIDAR in ArcGIS. These and other commercial hardware and software products meet the technical specifications of embodiments of the technology provided herein.

Imaging and Cameras

Embodiments of the technology comprise use of imaging (e.g., camera) technology. In some embodiments, imaging (e.g., imaging hardware and/or imaging software) is/are used to detect vehicles, pedestrians, and/or other objects; to recognize traffic signs; and/or to identify lane markings. In exemplary embodiments, the technology comprises use of imaging hardware providing imaging over a wide angle (e.g., approximately 170° field of view) at a high resolution. In some embodiments, the imaging hardware provides night vision (e.g., infrared, low or dim light sensitivity, or other night vision capabilities). In exemplary embodiments, the technology comprises use of imaging software providing vehicle detection (e.g., vehicle detection having a sensitivity (true positive rate) of 99% with 90% or greater confidence) and lane detection (e.g., lane detection having a sensitivity (true positive rate) of 99% with 90% or greater confidence. In some embodiments, the imaging software is configured to identify a drivable path using image data. In some embodiments, the imaging software is configured to measure and/or calculate the position, speed, and/or acceleration of other vehicles (e.g., passing vehicles). Some commercial imaging products may find use in embodiments of the technology provided herein. e.g., EyEQ4 from Mobileye (www.mobileye.com/our-technology).

While extant automated driving technologies comprise use of cameras installed on vehicles, embodiments of the technology described herein comprise use of cameras installed on infrastructure. In some embodiments, cameras installed on infrastructure are used to determine a drivable area on a road and delimiters of the drivable area, recognize the geometry of routes within a drivable area, and/or recognize multiple (e.g., all) road users within a drivable area or drivable path.

In some embodiments, the technology comprises use of barrier and guardrail detection (e.g., as described in U.S. Pat. App. Pub. No. US20120105639A1, incorporated herein by reference). In some embodiments, the technology comprises use of an image processing system (e.g., as described in EP2395472A1, incorporated herein by reference). In some embodiments, the technology comprises use of a camera mount (e.g., as described in U.S. Pat. App. Pub. No. US20170075195A1). In some embodiments, the technology comprises use of path prediction (e.g., as described in U.S. Pat. App. Pub. No. US20150325753A1, incorporated herein by reference). In some embodiments, the technology comprises use of road vertical contour detection (e.g., as described in U.S. Pat. App. Pub. No. US20130141480A1, incorporated herein by reference).

In some embodiments, imaging technologies use artificial intelligence, neural networks, and/or machine learning to process images and identify components of images (e.g., vehicles, signs, pedestrians, objects, lane markings, barriers and guardrails) and/or to identify drivable paths. In some embodiments, imaging technologies use supervised learning, reinforcement learning, and/or deep learning technologies.

Radar and Microwave Radar

Embodiments of the technology comprise use of radar technology (e.g., microwave radar technology). In some embodiments, the technology comprises use of radar (e.g., microwave radar) hardware. In some embodiments, radar hardware provides reliable detection accuracy. In some embodiments, radar hardware provides automatic lane segmentation on a multi-lane road. In some embodiments, the radar hardware provides vehicle speed data, traffic flow data, and/or vehicle occupancy with errors less than 5%. In some embodiments, the radar hardware performs reliably at temperatures lower than −10° C. Some commercial radar hardware products may find use in embodiments of the technology provided herein, e.g., the STJ1-3 from Sensortech (www.whsensortech.com). In some embodiments, the technology comprises use of radar (e.g., microwave radar) software. In some embodiments, the radar software is configured to measure and/or calculate the position, speed, acceleration, and/or volume of other vehicles (e.g., passing vehicles). Some commercial radar software products may find use in embodiments of the technology provided herein, e.g., the STJ1-3 from Sensortech (www.whsensortech.com) uses an algorithm to convert radar data to traffic information. These and other commercial hardware and software products meet the technical specifications of embodiments of the technology provided herein.

Communication

Embodiments of the technology comprise use of communications technology (e.g., for communication with vehicles and/or for communication with infrastructure (e.g., TCU)). In some embodiments, the technology comprises use of communications hardware. In some embodiments, communications hardware (e.g., for communication with vehicles) conforms with the IEEE 802.11p-2010 standard. In some embodiments, communications hardware provides a bandwidth of approximately 10 MHz and data rates of approximately 10 Mbps. In some embodiments, communications hardware operates at a frequency band of 5 GHz. In some embodiments, communications hardware has a Doppler spread of 800 km/hour and a delay spread of 1400 ns. In some embodiments, the communications hardware is powered by a 12 V or 24 V source. In some embodiments, the communications hardware operates with an antenna diversity that is a cyclic-delay transmit diversity (CDI). Some commercial hardware products may find use in embodiments of the technology provided herein, e.g., MK5 V2X from Cohda Wireless (cohdawireless.com) or the StreetWAVE from Savari (savari.net/technology/road-side-unit). In some embodiments, the technology provided herein has an improved stability with respect to extant technologies, e.g., to provide reliable communications for a complex driving environment.

In some embodiments, communications hardware (e.g., for communication with infrastructure (e.g., TCU)) conforms with the ANSI/PIA/EIA-492AAAA and 492AAAB standard. In some embodiments, communications is provided over communications media that is optical fiber. In some embodiments, communications hardware performs reliably in environmental operating ranges of approximately −40° C. to 55° C. Some commercial hardware products may find use in embodiments of the technology provided herein, e.g., Optical Fiber from Cablesys (www.cablesys.com/fiber-patch-cables).

Computation Device

In some embodiments, the technology comprises computation devices and/or systems. In some embodiments, a computation device and/or system integrates data from multiple sensors. In some embodiments, a computation device and/or system (e.g., configured to integrate data from multiple sensors) provides accurate estimation of the position and orientation of vehicles, high-resolution estimation of traffic state, autonomous planning of driving paths, and/or real-time detection of incidents. One example of a computation system provided as a module for a vehicle is the External Object Calculating Module (EOCM) from General Motors, which is provided in the active safety systems of certain vehicles. The exemplary EOCM system integrates data from different sources (e.g., a camera, radar, and other sensors) to provide decision-making functions and processes (see. e.g., U.S. Pat. No. 8,527,139, incorporated herein by reference).

Data Processing

In some embodiments, the technology comprises systems and/or methods for data processing. For example, in some embodiments, data processing comprises use of data fusion technology. Some commercial data fusion products may find use in embodiments of the technology provided herein, e.g., data fusion products from DF Tech to provide accurate and efficient integration of data and information from multiple sources. The data fusion products also provide backup services to address problems with sensor function and/or sensor data.

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A function allocation system for an automated driving system (ADS), said function allocation system comprising a sensing allocation system; a prediction and decision making allocation system; and a control allocation system,
   wherein said ADS system operates at a system intelligence level S=1, 2, 3, 4, or 5 during vehicle operation by identifying the vehicle intelligence level V of said vehicle during vehicle operation and identifying the infrastructure intelligence level I of said infrastructure during vehicle operation; and
   wherein said function allocation system is configured to allocate sensing, prediction and decision-making, and control functions to the vehicles based on the vehicle intelligence level V and the infrastructure based on the infrastructure intelligence level I to support said ADS system with system intelligence S that is greater than the vehicle intelligence level V and/or that is greater than the infrastructure intelligence level I so that the ADS system manages the vehicle and the infrastructure to facilitate vehicle operations and controls during vehicle operation.

2. The function allocation system of claim 1, wherein said function allocation system is configured to allocate sensing, prediction and decision-making, and control functions to connected and automated vehicles (CAV) and roadside intelligent units (RIU).

3. The function allocation system of claim 1, wherein said sensing allocation system allocates sensing functions at a microscopic level, a mesoscopic level, and/or a macroscopic level, wherein:
   said sensing functions at a microscopic level comprise vehicle positioning, environmental sensing, and sensing and/or communicating vehicle information;
   said sensing functions at a mesoscopic level comprise multi-vehicle sensing and road segment sensing; and
   said sensing functions at a macroscopic level comprise sensing network traffic flow and communicating information with a traffic control center (TCC).

4. The function allocation system of claim 1, wherein said sensing allocation system allocates sensing functions at a microscopic level and/or a mesoscopic level to CAV and allocates sensing functions at a microscopic level, mesoscopic level, and/or a macroscopic level to intelligent infrastructure.

5. The function allocation system of claim 1, wherein said sensing allocation system allocates vehicle-based sensing functions among CAV and allocates roadside-based sensing among intelligent infrastructure, wherein:
   said vehicle-based sensing functions comprise high-precision vehicle positioning functions; static high definition (HD) map functions; and sensing CAV steering angle, speed, and/or acceleration; and
   said infrastructure-based sensing functions comprise auxiliary vehicle positioning; real-time dynamic HD map; sensing pedestrians, vehicles, and/or obstacles; communicating information about road segments; and communicating network traffic flow information and/or information from a traffic control center (TCC).

6. The function allocation system of claim 1, wherein said prediction and decision making allocation system allocates prediction and decision-making functions at a microscopic level, a mesoscopic level, and/or a macroscopic level, wherein:
said prediction and decision-making functions at a microscopic level comprise predicting vehicle trajectory, planning vehicle origin and/or destination, and/or performing emergency adjustments;
said prediction and decision making functions at a mesoscopic level comprise predicting events, traffic incidents, work zones, traffic control operations, vehicle platooning, and/or predicting traffic for specific road segments comprising bridges, tunnels, ramps, service areas, intersections, tolls, and/or dedicated lanes; and
said prediction and decision-making functions at a macroscopic level comprise predicting traffic flow and/or weather; and managing traffic according to a user optimal and/or system optimal traffic strategy.

7. The function allocation system of claim 1, wherein said prediction and decision making allocation system allocates prediction and decision-making functions at a microscopic level to CAV and allocates prediction and decision-making functions at a mesoscopic level and/or a macroscopic level to intelligent infrastructure.

8. The function allocation system of claim 1, wherein said control allocation system allocates control functions at a microscopic level, a mesoscopic level, and/or a macroscopic level, wherein:
said control functions at a microscopic level comprise functions for controlling individual vehicles;
said control functions at a mesoscopic level comprise control of vehicle platooning; and providing control instructions and/or strategies by an RIU; and
said control functions at a macroscopic level comprise control of traffic flow; and providing control instructions and/or strategies by a TCC and/or a traffic operations center (TOC).

9. The function allocation system of claim 1, wherein said control allocation system allocates control functions at a microscopic level to CAV and allocates control functions at a mesoscopic level and/or a macroscopic level to intelligent infrastructure.

10. The function allocation system of claim 1, further comprising a fusion system configured to provide sensing data fusion, prediction and decision-making data fusion, and/or control data fusion to support sensing functions, predicting and decision making functions, and/or control functions of said ADS.

11. The function allocation system of claim 10, wherein said fusion system comprises a vehicle-centric fusion system, a roadside-centric fusion system, and/or a system-level fusion system, and said fusion system is configured to allocate sensing functions, prediction and decision making functions, and control functions among said vehicle-centric fusion system, said roadside-centric fusion system, and/or said system-level fusion system.

12. The function allocation system of claim 11, wherein said vehicle-centric fusion system is configured to perform real-time vehicle data processing comprising integrating real-time vehicle data provided by a vehicle and environmental data provided by an RIU.

13. The function allocation system of claim 11, wherein said roadside-centric fusion system comprises an RIU fusion subsystem configured to perform real-time RIU data processing comprising integrating real-time vehicle information, environment information, and/or traffic information in a geographical area.

14. The function allocation system of claim 13, wherein said RIU fusion subsystem is configured to:
provide sensing data fusion comprising integrating infrastructure sensing data from infrastructure sensors and vehicle sensing data from vehicle sensors;
provide prediction and decision making data fusion comprising integrating data for event prediction, vehicle platooning, and/or information for a specific road segment; and
provide control data fusion comprising integrating information for intersection control, vehicle platooning control, and/or specific road segment vehicle control.

15. The function allocation system of claim 14, wherein said sensing data fusion provides real-time vehicle position and dynamic vehicle information for multiple vehicles.

16. The function allocation system of claim 14, wherein said RIU fusion subsystem is configured to:
request information and/or data from vehicles and fuse said data and/or information from vehicles to improve a real-time dynamic map;
request speed limit information, emergency response vehicle information, and/or information describing vehicle emergencies from a TCU to improve prediction and decision-making functions; and
provide information to an RIU from a TCU to improve control functions.

17. The function allocation system of claim 11, wherein said system-level fusion system is configured to perform real-time system level data processing comprising integrating real-time vehicle data provided by an RIU, a vehicle onboard intelligent unit (OIU), a traffic control center (TCC), a traffic information center, a database, and/or a meteorological station.

18. The function allocation system of claim 11, wherein said system-level fusion system is configured to perform sensing data fusion comprising:
requesting data from vehicles, road segment infrastructure, and/or a traffic information center; and/or
integrating environment information provided by an RIU, TCC, and/or vehicle sensors; dynamic map data provided by a database; vehicle positioning data provided by vehicle sensors and/or by an RIU; vehicle information data provided by infrastructure, RIU, and/or TCC; and/or road segment information provided by vehicle, an RIU, and/or a TCU.

19. The function allocation system of claim 11, wherein said system-level fusion system is configured to perform prediction and decision-making data fusion comprising:
requesting and/or receiving data from vehicles, a road segment, and/or a traffic information center; and/or
integrating environment situation prediction data, traffic flow prediction data, road segment trajectory prediction data, and/or emergency adjustment data.

20. The function allocation system of claim 1, wherein said function allocation system is configured to integrate information from CAVs operating at an intelligence level V and roadside intelligent infrastructure operating at an intelligence level I to provide an intelligence level S to said ADS,
wherein S is greater than V, S is greater than I, and V is greater than 2;
wherein said CAV are configured to receive information and instructions from the intelligent infrastructure and said CAV are configured to send information to said intelligent infrastructure; and wherein said roadside intelligent infrastructure is configured to provide sensing functions, computation resources, and/or planning and decision-making functions and to support said CAV to perform automated driving tasks by sending information and instructions to CAV.

\* \* \* \* \*

UNITED STATES PATENT AND TRADEMARK OFFICE
CERTIFICATE OF CORRECTION

PATENT NO. : 12,037,023 B2
APPLICATION NO. : 17/328625
DATED : July 16, 2024
INVENTOR(S) : Bin Ran et al.

It is certified that error appears in the above-identified patent and that said Letters Patent is hereby corrected as shown below:

In the Claims

Claim 20, Column 32, Line 62 reads:
"wherein S is greater than V, S is greater than I, and Vis",
Whereas it should read:
"wherein S is greater than V, S is greater than I, and V is".

Signed and Sealed this
Twenty-second Day of October, 2024

Katherine Kelly Vidal
*Director of the United States Patent and Trademark Office*